United States Patent
Goodley

(10) Patent No.: US 10,150,052 B1
(45) Date of Patent: Dec. 11, 2018

(54) SYSTEM AND METHOD FOR EVAPORATION AND COLLECTION OF LIQUIDS

(71) Applicant: Mark D. Goodley, Newport Beach, CA (US)

(72) Inventor: Mark D. Goodley, Newport Beach, CA (US)

( * ) Notice: Subject to any disclaimer, the term of this patent is extended or adjusted under 35 U.S.C. 154(b) by 0 days.

(21) Appl. No.: 15/879,695

(22) Filed: Jan. 25, 2018

Related U.S. Application Data

(60) Provisional application No. 62/568,042, filed on Oct. 4, 2017.

(51) Int. Cl.
| | | |
|---|---|---|
| *B01D 3/30* | (2006.01) | |
| *B01D 1/14* | (2006.01) | |
| *B01D 5/00* | (2006.01) | |
| *C02F 1/04* | (2006.01) | |
| *B01D 3/34* | (2006.01) | |
| *C02F 103/08* | (2006.01) | |

(52) U.S. Cl.
CPC ............. *B01D 3/30* (2013.01); *B01D 1/14* (2013.01); *B01D 3/346* (2013.01); *B01D 5/0066* (2013.01); *C02F 1/048* (2013.01); *C02F 2103/08* (2013.01)

(58) Field of Classification Search
CPC .......... B01D 1/048; B01D 3/30; B01D 3/346; B01D 5/0066; C02F 1/048; C02F 1/14
See application file for complete search history.

(56) References Cited

U.S. PATENT DOCUMENTS

| | | | | |
|---|---|---|---|---|
| 2,609,335 A | * | 9/1952 | Hickman | B01D 3/10 159/6.1 |
| 3,462,132 A | * | 8/1969 | Kaelin | B01F 3/04773 239/17 |
| 3,497,185 A | * | 2/1970 | Dively | B01F 3/04773 210/219 |
| 3,846,517 A | * | 11/1974 | Ross | B01F 3/04773 210/242.2 |
| 3,871,581 A | * | 3/1975 | Dively | B01F 3/04773 239/16 |
| 4,001,077 A | * | 1/1977 | Kemper | B01D 1/0005 159/4.2 |
| 4,198,360 A | * | 4/1980 | Shafranovsky | B01D 1/16 261/90 |
| 4,219,387 A | * | 8/1980 | Gruntman | B01D 1/0005 202/182 |
| 4,882,012 A | * | 11/1989 | Wasserman | B01D 1/0017 122/508 |
| 5,053,110 A | * | 10/1991 | Deutsch | B01D 3/02 202/176 |
| 7,448,600 B1 | * | 11/2008 | Boulter | C02F 1/048 159/4.4 |

(Continued)

*Primary Examiner* — Jonathan Miller
(74) *Attorney, Agent, or Firm* — Buchanan Ingersoll & Rooney PC

(57) ABSTRACT

A method and system/device for enabling an efficient and increased rate of evaporation of liquids, which can be used, for example, to separate solutes from solvents, including desalination of salt water. The method and system/device are directed to introducing kinetic energy into an evaporative system to cause movement and agitation of liquid and/or air molecules, and employing a gravity assist, to more efficiently and effectively promote evaporation of the liquid.

19 Claims, 21 Drawing Sheets

(56) References Cited

U.S. PATENT DOCUMENTS

| | | | | |
|---|---|---|---|---|
| 7,494,572 | B2* | 2/2009 | Tonkin | B01D 61/362 |
| | | | | 203/10 |
| 8,808,497 | B2* | 8/2014 | Duesel, Jr. | B01D 1/0005 |
| | | | | 159/16.1 |
| 9,102,545 | B2* | 8/2015 | Riley | B01D 1/225 |
| 9,169,132 | B2* | 10/2015 | Riley | B01D 1/225 |
| 9,327,207 | B2* | 5/2016 | Al-Garni | B01D 1/22 |
| 2017/0225992 | A1* | 8/2017 | Duesel, Jr. | C02F 11/14 |
| 2017/0334738 | A1* | 11/2017 | Suh | C02F 1/14 |

* cited by examiner

SYSTEM AND METHOD FOR EVAPORATION AND COLLECTION OF LIQUIDS

CROSS REFERENCE TO RELATED APPLICATION

This application claims the benefit of U.S. Provisional Application No. 62/568,042, filed on Oct. 4, 2017, which is incorporated by reference herein in its entirety.

FIELD

The present disclosure relates to a system and method for enabling an efficient and increased rate of evaporation of liquids, which can be used, for example, to separate solutes from solvents, including desalination of salt and brackish water.

BACKGROUND

Producing clean fresh water is critically important worldwide. As the demand increases linearly with the world's population, and the supply of fresh water decreases, the challenges to produce adequate amounts of fresh water are increasing daily.

Known desalination systems, including those that rely primarily on solar energy, operate and produce fresh water, but very slowly and often inefficiently. Yet, observing the planet's weather, and rain patterns, one can't help wonder why this has to be. If nature can efficiently produce large amounts of fresh water (e.g., rain) from salt water, why can't we? This isn't a trivial question, but rather it's a question of great and tremendous import. We must explore what is wrong with the current attempts at desalination, and explore the differences between manmade solar desalination methods and devices and those used by nature. If we can learn to, in a sense, imitate the sun and earth, then we can on command, potentially produce large quantities of more fresh, clean, drinking water; without having to resort to outrageously expensive and inexpensive systems, such as those based on reverse osmosis.

In many places on the planet, fresh water is the single biggest critical human (and animal) health issue. Approximately 40% of the earth's population lives on an ocean shoreline, with approximately 85% of the population living within 60 miles. In addition, around three quarters of the world's mega cities are by the sea, where there is no lack of salt/saline water.

The basic concepts of manmade desalination have not been challenged, let alone significantly changed, in years. The underlying concepts and principles of today's desalination devices are simply wrong. For example, nearly all, if not all, manmade desalination devices made to date rely on a container (or pipe) of some size, with some amount of salt/brackish/dirty water comprising the "containment reservoir," and in the non-pipe configuration, a sealed cover over to allow the evaporative vapor to condense and form water drops that are then gravity fed into a storage tank. Some have reflective mirrors of various sizes (large and/or small) directing sunlight into the device. None of the devices, however, work and generate an appreciable amount of fresh water in the absence of sunlight.

Known devices rely on a static, sedentary, flat/horizontal, environment. In contrast to nature, current desalination solar stills are horizontal/level, motionless, immobile, and inanimate. This results in a plethora of problems.

Many of the shortcomings of known methods are rooted in basic molecular water chemistry and physics. Water is composed of self-hydrophilic, strongly bipolar/dipolar, highly charged hydrogen/oxygen molecules. In other words, water molecules like to stick to themselves. Indeed, water molecules literally are bonded and don't want to leave each other. This is particularly the case at the water's surface. These forces bind water molecules to each other like a kind of magic/magnetic glue to form a surface or interfacial tension. Everyday examples that highlight this phenomenon include an insect walking on water, the famous straight pin lying on top of the water's surface in a glass, and the minimal surface shape of a water droplet. Water's dipolarity attraction (hydrogen bonding) also enables molecules to "stick" to each other and climb up surface, for example, inside tube surfaces. It should be noted, however, that in general surface tension (air/water interface) always develops on flat/horizontal/undisturbed surfaces.

Gravity is an additional force acting against current (horizontal) desalination methods and devices. Most all solar desalination systems, multi-effect and otherwise, simply do not exploit this principle and are designed to lie in a single, flat and/or, horizontal plane; a critical error.

Known methods and systems also include static, unmoving air hovering above the water. Such configurations rely on the "chance" that water vapor could/might eventually contact and "attach" itself to the still's capture surface area and condense to form droplets, but this is purely by "chance" and is in fact a small statistical probability.

In contrast to the static, unmoving manmade desalination systems of today, the Earth's environment, including heat, generates wind and waves, which constantly agitate both sea and air; stirring boundary layers of hot/cold water, mixing air into the ocean/sea below the water's surface, and mixing air into itself above the water's surface. Generally, Earth's system is in constant vibrating motion. Further, a huge amount of stored energy continues to generate fresh water even after the sun goes down.

The well-known Penman-Shuttleworth Evaporation Equation attempts to quantify this process and provide a minimum evaporation rate in gal/day:

$$E_{mass} = \frac{mR_n + \gamma * 6.43(1 + 0.536 * U_2)\delta e}{\lambda((m + \gamma)}$$

It is important to note, however, that while this equation is known, it does not, in any way, take into account or adjust for kinetics (other than wind speed) that are acting on the system—a fact that presents another fundamental flaw with the current understanding of evaporation and desalination.

What nature has evolved to "understand" is that surface tension tends to draw the surface molecules into the bulk of the liquid and by removing this force or "glue," water molecules are more freely allowed to escape. In other words, if water is not allowed to form linear/flat surfaces against the air barrier, surface/interfacial tensions cannot form or are greatly decreased.

In nature, the sun's heat/light creates high/low atmospheric pressure zones, blowing water/air molecules apart from each other, while the wind and waves are stirring up the seas, rising and falling on itself, stirring together layers of aerated water, which rises to the atmosphere, and then utilizing gravitational pull, continually mixes, and stretches the water molecules, breaking surface tension. Such an effect can be easily seen in everyday life. Stir a cup of hot coffee or tea, for example, and observe the increase of steam (water vapor) that is released compared to a static, unmixed cup.

In science and chemistry, this addition of "energy"/(motion) into a closed system is mathematically described as/by the term "kinetics." Kinetics is a critical component to driving chemical and biological reactions. Kinetics occurs on a macro (visible) scale and/or micro (invisible to the eye) scale. Thus, to efficiently and effectively promote evaporation and desalination, one must not only consider, but effectively employ, one or more kinetic energy inputs into the process.

In view of the foregoing discussion and state of manmade evaporative and desalination devices, aspects of the present disclosure are directed to producing fresh water from salt water in an efficient and economic manner, and overcoming problems/issues with known desalination devices. Generally, in current desalination devices a vessel is filled with salt/saline water and a cover is placed over the top of it. As water naturally evaporates, some percentage of the vapor attaches and condenses on the cover, forming droplets, which are pulled by gravity down the surface into a separate containment vessel.

Following is a non-exhaustive list of issues with known desalination systems that aspects of the present disclosure address to thereby provide optimal desalination: 1) water molecules "sticking" to each other at the water/air surface boundary (surface tension); not allowing/releasing molecules to "escape" or evaporate into the air; 2) stagnant air that isn't moving across the water's surface, therein not creating surface friction or breaking surface tension; 3) stagnant air that isn't being mixed into the water reservoir and isn't escaping up from the water and "towing" attached water molecules up with it; 4) humid condensing air that isn't being driven against/into the capture cover/membrane(s), rather it's left to probability and random chance; 5) flat/horizontal system that doesn't utilize gravity's force to stretch water molecules across the reservoir walls and surface, breaking surface tension molecular bonds; 6) the systems often don't create low pressure zone(s) where evaporative humid water vapor is generally (vacuum) released into the atmosphere, (note that the reverse—high pressure areas—force water vapor back into solution; 7) current systems haven't increased and maximized the key water/air surface area interface of the system; 8) many current systems have not increased the number of methods/mechanism(s) (effects/phases) that capture condensed and non-condensed water vapor, and rely entirely on collecting water vapor from only the surrounding cover membrane; 9) most current systems are closed systems, making them difficult to maintain, clean and/or remove deposited materials and are subject to clogging and restricted performance; 10) current systems that rely on solar energy generally only work during the day (even without sun during the night, fresh water still needs to be generated; water gathering storms don't stop at night, neither can our desalination systems); 11) current systems don't cool capture membrane/air to increase condensation; and 12) even most "advanced" current systems collect/use stored energy as heat and are dependent on AC power sources, i.e., the local power grid. Many known desalination systems, even solar, still require some AC power to run equipment like vacuum pumps, motors, etc. Economically, using AC power requires sacrificing large amounts of money or barrels of oil. Many/most areas on the planet don't have power grid access, thereby limiting the use of known systems.

To improve/increase evaporation, including solar production of fresh water, the present invention addresses the foregoing issues. Exemplary embodiments as disclosed provide an affordable, portable, (and scaled up fixed infrastructures), and easy to manufacture systems that employ novel and cutting edge evaporative and collection methods.

Using only basic physics and water chemistry, and the methods and devices disclosed herein, it will be common place to make fresh water from saline many times faster than ever thought possible or achieved before. The present disclosure is directed to methods and systems for increasing the rate and efficiency of liquid evaporation, which can be used for desalination. Through the use of kinetic energy input, which can be provided through an AC power grid or a non AC power grid energy source, and in certain embodiments in tandem with a gravity assist, the disclosed methods and systems overcome chemical and physical barriers and limits of the known evaporative and desalination methods and systems to simultaneously and substantially increase both the evaporation and the recovery/condensation capture rates. Several exemplary embodiments are presented, representing differences and variations in usage, scaled size, and logistics.

SUMMARY

A method is disclosed for increasing a rate of liquid evaporation, the method comprising: allowing a flow of liquid into an at least partially closed volume of a reservoir; and introducing kinetic energy through one or more mechanical agitators, to disrupt a surface or interfacial tension of the liquid within the at least partially closed volume, the one or more mechanical agitators being arranged to cause displacement of droplets of the liquid in an at least partially vertical direction which is substantially perpendicular to the liquid surface and counter to a gravitational force to produce humid air above the surface of the liquid.

A device is disclosed for evaporation of a liquid, the device comprising: a reservoir for retaining a volume of liquid within an at least partially closed volume located above a designated liquid surface of the reservoir; a mechanical agitator configured and arranged for contacting the liquid when present in the reservoir and displacing droplets of the liquid in an at least partially vertical direction perpendicular to a surface of the liquid and counter to a direction of gravitational force; and one or more air flow devices for producing an air flow approximately parallel to the liquid surface so as to act on droplets displaced from the liquid in the at least partially vertical direction.

BRIEF DESCRIPTION OF THE DRAWINGS

Exemplary embodiments are best understood from the following detailed description when read in conjunction with the accompanying drawings. Included in the drawings are the following figures.

DETAILED DESCRIPTION

Figure 1:
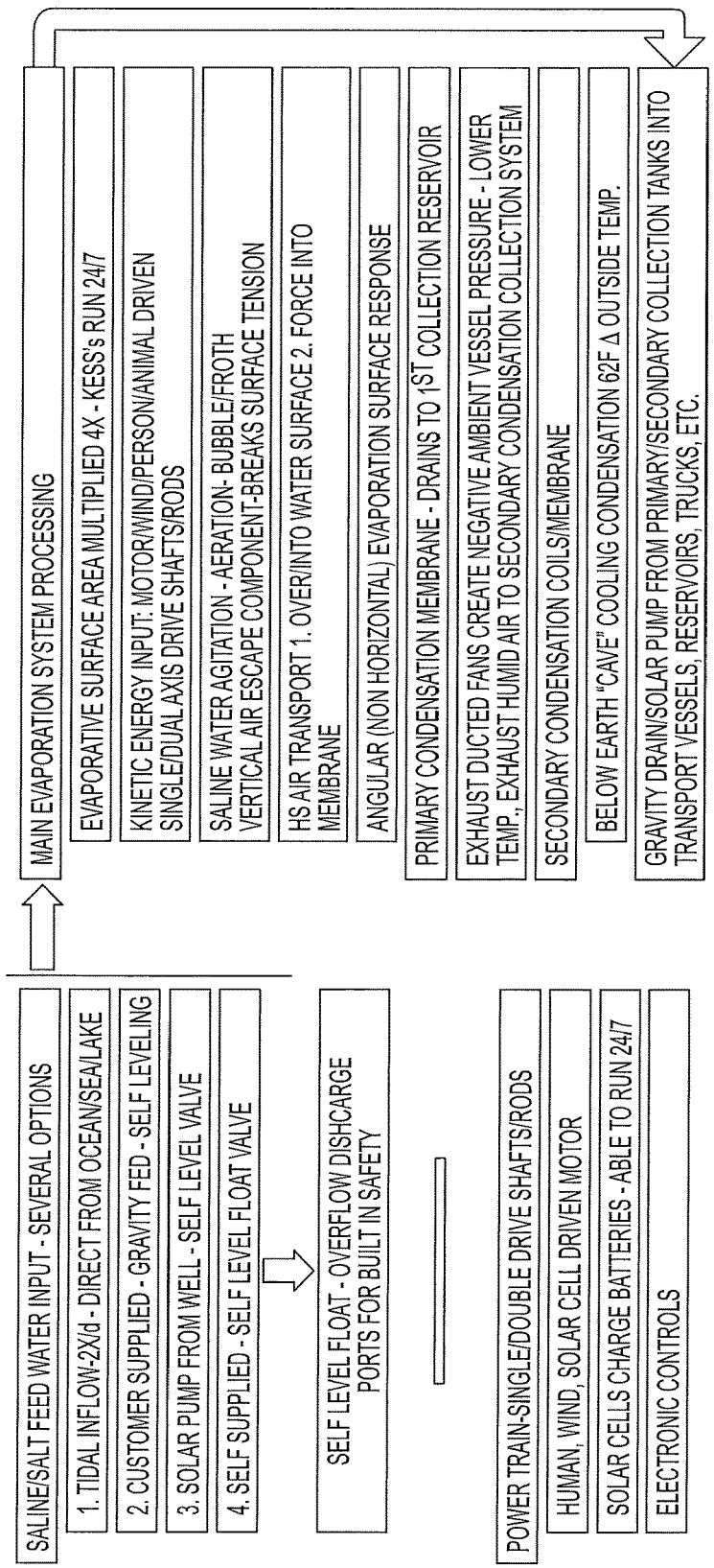
FIG. 1 is a flow chart depicting exemplary methods for enhanced evaporation of a liquid.

The present disclosure is directed to introducing kinetic energy into an evaporative (e.g., desalination) system and employing air-water chemistry and physics, with a gravity assist to more efficiently and effectively promote evaporation. An example of how the force of gravity may assist the evaporative process is the effect on the rate of evaporation of a liquid (e.g., water) from an angled surface compared to a horizontal or flat surface. The ratio ($E_\theta/E_h$) of evaporative rate between the two scenarios seems to remain constant with or without sunlight, although the rate clearly increases with solar radiation. The fundamental underlying principals remain unresolved and subject to further experimentation/evaluation. This multiplying variable factor, however, may be referred to herein as "gravity assist" ($E_\theta/E_h = \Gamma$).

Devices (systems) and methods that are disclosed can use the intentional addition of kinetic energy into the system to cause movement and agitation of water and air, which results in increased rate and efficiency of evaporation. Such devices and methods can be used, for example, to separate solutes from solvents and for desalination of salt water.

In certain exemplary embodiments the surface/top of the liquid (e.g., saline water) is agitated as air is introduced into it, forcing the air in and upward as bubbles and waves, thereby breaking the surface tension of the liquid. Some percentage of the bubbles also crush/collapse/escape the liquid at supersonic speeds, at a molecular level, violently breaking surface tension forces as well, carrying water vapor vertically upward with them into the air above the liquid.

In some embodiments, liquid (e.g., saline water) is driven up the surrounding walls, allowing gravity's force to pull and stretch the water molecules apart (breaking surface tension bonds) as the water descends back down the walls.

In certain embodiments, air is blown across and/or directly into the liquid (e.g., saline water) surface, increasing the air's ability to capture departing water molecules due to imparted friction with the surface.

In some embodiments, a cyclonic air pattern (e.g., "tornado") is created above the liquid reservoir, driving the humid air (vapor) into and across a capture surface (e.g., a cover membrane) where it is allowed to condense, and form droplets as they stick and slide down the surface into a condensed liquid (e.g., fresh water) reservoir.

In certain embodiments, the wetted rotating water paddles provides a substantially larger surface area (a several fold increase) on the water/air evaporation mass transfer interface.

In some embodiments, as humid air is pulled/drawn out of the primary chamber, a low pressure area/volume is created inside the main chamber, aiding the evaporation process, pulling air out of solution, cooling the air (evaporation) and "driving" the "reaction" towards condensation, which furthers the cooling/condensation cycle of humid air.

In certain embodiments, the system is a dual-capture system, wherein the humid air flow is forced through the main chamber, through condensation tubes and/or membranes into a secondary, below ground level, "capture vessel" (optional). In some embodiments, fans/blades, which may be ducted, force the flow of humid air into and through air permeable/water condensing membranes housed in the "capture vessel box," which increases the amount of native recovery/condensation of condensed liquid (e.g., fresh water).

In some embodiments, the device can be configured to provide for an open and easy to maintain and clean system. For example, the device may comprise "hinges" or other structures that easily allow for the device to be opened, thereby providing access to the internal components of the device.

In certain embodiments, the device or method uses cool capture surfaces and/or water traps to increase the rate and efficiency of capturing the evaporating liquid. In some embodiments, the device or method of the invention uses reflective (e.g., white) surfaces to aid in promoting evaporation of the liquid. In certain embodiments, condensation is aided by the use of below ground, earth-thermo-coupled condensation/collection tank coils. In certain embodiments, the invention uses the reduced temperature of a below ground environment to aid in the condensation process.

In some embodiments, energy is stored during the daylight hours for use throughout the nighttime. In certain embodiments, energy is stored electrically. In some embodiments, excess energy created can be stored in a battery, fuel cell, or any other known electrical energy storage device. In some embodiments, the method and/or device of the invention uses sunlight to aid in the process. Certain embodiments, can function in the absence of, or reduced exposure to, sunlight.

Certain embodiments are directed to a method for increasing a rate of liquid evaporation, the method allowing a flow of liquid into an at least partially closed volume of a reservoir; producing kinetic energy by one or more mechanical agitators, and applying the kinetic energy to disrupt a surface or interfacial tension of the liquid within the at least partially closed volume, the one or more mechanical agitators being arranged to cause displacement of droplets of the liquid in an at least partially vertical direction, which is substantially perpendicular to the liquid surface and counter to a gravitational force to produce humid air above the surface of the liquid.

In certain embodiments, one or more mechanical agitators are arranged to establish an air flow path for causing the displacement of droplets of the liquid; and applying an additional air flow path approximately parallel to the liquid surface to act on the liquid droplets displaced from the liquid surface.

Exemplary embodiments can include carrying a vapor having droplets of the liquid away from the surface of the liquid. Certain embodiments include contacting the liquid and/or air above the liquid with the one or more mechanical agitators, wherein the one or more mechanical agitators include a paddle, a disc, a propeller-like blade, or a combination thereof.

Some embodiments include applying an additional air flow path above the liquid, which is approximately parallel to the liquid surface to remove the humid from air above the liquid. Certain embodiments include producing the additional air flow path above the liquid to remove humid air with a fan.

Some embodiments include reducing the air pressure above the surface of the liquid. Certain embodiments includes increasing the evaporative surface area of the liquid. In some embodiments, the evaporative surface area of the liquid is increased by contacting the liquid with one or mechanical agitators that includes a honeycombed structure.

Some embodiments include cooling the humid air and/or passing the humid through a membrane and condensing at least a portion of the humid air to form a condensed liquid. Certain embodiments include collecting at least a portion of the condensed liquid. Some embodiments include capturing at least a portion of the humid air on a capture surface, condensing at least a portion of humid air on the capture surface to form a condensed liquid, and collecting at least a portion of the condensed liquid.

Certain embodiments include connecting the one or more mechanical agitators to a power supply that is fueled by solar energy, wind energy, mechanical energy, human or animal motion, a battery, a fuel cell, or a combination thereof.

Some embodiments are directed to a device for evaporation of a liquid, the device including a reservoir for retaining a volume of the liquid within an at least partially closed volume located above the liquid surface; one or more mechanical agitators configured and arranged for contacting the liquid when present in the reservoir and displacing droplets of the liquid in an at least partially vertical direction perpendicular to a surface of the liquid and counter to a direction of gravitational force; and an air flow device for producing an air flow approximately parallel to the liquid surface so as to act on droplets displaced from the liquid in the at least partially vertical direction.

In certain embodiments the device includes sloped or vertical walls positioned over the reservoir at angels to the surface of the liquid when present in the reservoir to form the at least partially closed volume. In some embodiments the one or more mechanical agitators of the device include lap paddles (which may be rectangular or any other desirable shape) with honeycomb (or any other evaporative surface area-increasing geometry) structure and/or discs with honeycomb (or any other evaporative surface area-increasing geometry) structure arranged on a first axis. In certain embodiments the air flow device includes propeller-like blades arranged on a second axis parallel to the first axis.

In certain embodiments the device includes an outlet tube for receiving liquid droplets removed from the at least partially closed volume via air flow produced by the air flow device. In some embodiments the device includes an elbow for connecting the outlet tube with a condensation reservoir. In certain embodiments the device is in combination with a condensation reservoir located beneath a surface of the earth.

Some embodiments the device is in combination with a power supply, wherein the power supply is fueled by solar energy, wind energy, mechanical energy, human or animal motion, a battery, a fuel cell, or a combination thereof.

Certain embodiments are directed to a method for increasing the rate of evaporation of a liquid having a surface or interfacial tension comprising providing kinetic energy to disrupt the surface or interfacial tension of the liquid, thereby increasing the rate of evaporation of the liquid, wherein the kinetic energy is produced by an agitator, and wherein the agitator is connected to a power source.

In some embodiments at least a portion of the kinetic energy is introduced into the liquid, into air above the liquid, and/or air contacting the liquid. In certain embodiments at least a portion of the kinetic energy is provided by air being introduced into the liquid and/or by blowing air across the surface of the liquid. In some embodiments at least a portion of the air being introduced into the liquid and/or at least a portion of the air blowing across the surface of the liquid carries a vapor away from the liquid.

In certain embodiments, the agitator contacts the liquid and/or contacts the air above the liquid. In some embodiments, the agitator includes a paddle or blade. In certain embodiments, humid air is removed from air contacting the liquid and/or air above the liquid. In some embodiments, the humid air is cooled and/or passed through a membrane. In some embodiments, at least a portion of the humid air is condensed to form a condensed liquid. In certain embodiments, at least a portion of the condensed liquid is collected. In some embodiments, the collected condensed liquid is subjected to electrolysis.

In certain embodiments, a low pressure atmosphere is produced in air contacting the liquid and/or air above the liquid. In some embodiments, the low pressure atmosphere is at least partially created by placing the liquid below ground level. In certain embodiments, the low pressure atmosphere is at least partially created by creating a suction or vacuum in the air above the surface of the liquid. In some embodiments, the liquid is present in a reservoir. In certain embodiments, at least a portion of the liquid is driven up a wall surrounding the reservoir, wherein the wall extends above the surface of the liquid.

In some embodiments at least a portion of the evaporated liquid is cooled and condensed to form a condensed liquid. In certain embodiments at least a portion of the evaporated liquid is condensed on a membrane and/or a capture surface to form a condensed liquid. In certain embodiments of the invention the capture surface is a non-membranous surface.

In certain embodiments the method provides a cyclonic air pattern in air contacting the liquid and/or in air above the liquid, wherein the cyclonic air pattern drives a vapor comprising evaporated liquid into and/or across a capture surface.

In some embodiments the agitator is connected to a power source, wherein the power source is fueled by solar energy, wind energy, mechanical energy, human or animal motion, a fuel cell, and/or a battery. In certain embodiments, the power source is a battery, provides direct current power to the agitator, and/or provides alternating current power to the agitator. In certain embodiments, the power source is fueled by a conventional power grid.

In certain embodiments heat is provided to the liquid, air contacting the liquid, and/or air above the liquid. In some embodiments, at least a portion of the heat is from the sun. In certain embodiments, the heat from the sun is concentrated or amplified by one or more reflection sources. In some embodiments, at least a portion of the heat is supplied to the evaporation unit or reservoir and/or liquid contained within the device through one or more channels that may be filled with air or any desired liquid. The channels may extend under and along a partial length or the full length of the device or evaporation chamber. In certain embodiments, the one or more channels allow for heating or cooling of the central evaporation unit without affecting evaporation capture tanks located separately from the evaporation unit.

In some embodiments a method includes cooling the surface of the liquid. In certain embodiments, the liquid is cooled by placing the liquid below ground level. In some embodiments of the invention the liquid comprises water and salt. In certain embodiments the liquid is seawater.

Some embodiments are directed to a method for removing a solute from a liquid solution having a solute and solvent, the method including providing kinetic energy to disrupt the surface or interfacial tension of the liquid, thereby increasing the rate of evaporation of the liquid, wherein the kinetic energy is produced by an agitator, and wherein the agitator is connected to a power source.

Certain embodiments are directed to a method for purifying saltwater which includes providing kinetic energy to disrupt the surface or interfacial tension of the saltwater, thereby increasing the rate of evaporation of the saltwater, wherein the kinetic energy is produced by an agitator, and wherein the agitator is connected to a power source.

Some embodiments are directed to a desalination device for increasing the rate of evaporation, the device including a reservoir, one or more agitators, and a capture surface. In certain embodiments the device includes a storage container, and or a wall surrounding the reservoir. In some embodiments, the wall extends above the reservoir and/or the device comprises a cover. In certain embodiments, the cover is attached to the wall or sealed to the wall. In some embodiments the cover is a dome or a hyperbolic geometry. In certain embodiments the cover includes a capture surface, wherein the capture surface comprises a membrane, porous surface, and/or non-porous surface.

In some embodiments the agitator is connected to a power source, wherein the power source is fueled by solar energy, wind energy, mechanical energy, a battery, and/or a fuel cell. In certain embodiments, the power source provides alternating current power or direct current power to the agitator.

In certain embodiments, one or more of the agitators includes a paddle, blade, and/or disc. In some embodiments one or more of the agitators is located within the reservoir or above the reservoir. In some embodiments the device contains one or more electrodes and the electrode is optionally located within the reservoir. In some embodiments the device includes one or more reflective sources, wherein the reflective source is a mirror or a reflective panel.

In certain embodiments the device is connected to a source of liquid, wherein the source is a body of water, a tank, or a vessel. In some embodiments, the body of water is a sea or ocean.

The methods and devices disclosed herein can be powered through any known power source, including, but not limited to, solar power, wind power, mechanical power, electrical power, and hydro power.

For example, exemplary embodiments can use a motor/wind vane to agitate airflow over the liquid (e.g., water) that simultaneously breaks surface tension and enables moist, humid, vapor rich air, to be driven directly into the capturing surface. In addition, a motor/wind vane can directly agitate and mix air into the liquid (e.g., water) reservoir and drive the water up and onto the surrounding walls of the reservoir or device to enable gravitation force to stretch the liquid molecules and break surface tension hydrogen bonds.

Reflection panels (that can be enclosed in the device or connected to the exterior of the device) can be included to increase the sun's footprint on the device or system, warming the liquid (e.g., water) and creating steam vapor within a negative pressure chamber in which the air volume is forcefully driven into a collection surface. The reflection panels can be present in a variety of shapes and materials, including, but not limited to plastic, metal (e.g., aluminum), and include a reflective surface. The collection surface can take various forms, including, but not limited to a membrane, a porous or semi-porous surface. Exemplary surfaces include plastics, a hard acrylic shell, soft collapsible PVC, and so forth. The capture surface can be present in variety of shapes and geometries, including but not limited to, a dome, or a hyperbolic surface.

The main body or housing and containment reservoirs can be constructed by any method and material known in the art, including molded/constructed/manufactured and scaled from vinyl sheeting and thermo plastics on the small scale side, to reinforced concrete and concrete block walls, and sand structures on the larger scale. In embodiments directed to desalination and production of fresh water, the fresh water output is at least partially dependent upon saline water volume and surface area input.

Exemplary embodiments can also use stored heat/electric energy (batteries) that can be released into the system during nighttime and/or times of limited solar exposure. Certain exemplary embodiments do not need to rely on the sun throughout the process, for example to produce fresh water. By maximizing evaporative surface area, and providing air flow over it, condensed liquid (e.g., fresh water) can be generated day and night. In contrast to other systems, exemplary embodiments do not store excess energy as heat.

The earth's atmosphere reduces dew point (condensation) temperatures via altitude. Certain exemplary embodiment achieve a similar result by reducing capture surface temperatures and/or lowering atmospheric pressures with below ground level cooling (which averages about 62° F. worldwide) using below ground level capture and storage tanks. In certain embodiments, the atmospheric pressure in the system can be lowered, for example, by creating a suction or vacuum effect in the system through varying the exhaust and intake diameters and/or varying the fan propeller used in such exhaust or intake ports. In some embodiments, humid air is removed from the main chamber through an exhaust port, wherein the port contains a fan. In some embodiments the fan is ducted. In certain embodiments the humid air contacts a parabolic centrifugal collector/deflector ("PCCD") prior to entering the exhaust port. In some embodiments, at least a portion of the humid air is condensed on the centrifugal collector/reflector and collected from the centrifugal collector/deflector. Without being bound by a particular theory, the PCCD will act to create an airflow over and through the exhaust ducted fans, thereby creating a small back-pressure, "voltage/governor" control in the system. It simultaneously also enlarges the condensation collection surface area. In certain embodiments, condensation can either fly off the PCCD centrifugally, or be wiped off and drained into the fresh water collector/reservoir.

In certain embodiments, for example, the case of desalination of salt water, the disclosed system may also use excess stored energy and enclosed electrodes to generate a small electrolysis field, breaking down the salt into hypochlorous acid (HClO) and sodium hypochlorite (NaClO) and sterilizing the fresh water.

Certain embodiments can be scaled up, both size-wise and individually in serial/parallel configurations to meet the production requirements. In certain embodiments, devices can be circular in shape or linear-shaped. For example, circular/round thermoformed systems of the present invention can be used for individual personal water sources. Such systems may be used to produce, for example, 6-10 gal/day of fresh healthy water from salt water. On the other hand, linear systems can be daisy chained together to form very large networks, which may be used, for example to supply large operations such as agricultural acreage, hydroponic gardens, and so forth. Such systems maybe constructed to process up to, for example, 10 million gallons per day of liquid.

In certain embodiments, for example desalination of salt water, salt water may be supplied to the system by salt water tanks (e.g., gravity fed to the system), by rise and fall of the tide (e.g., for systems situated next to the ocean or sea water), by pumps, including solar panel drive pumps. In addition, in certain embodiments the device contains overflow holes to prevent overfilling and the mixing of saline water with the condensed fresh water.

Historically, the Penman equation is the most commonly used equation for ocean desalination evaporation calculations:

$$E_{mass} = \frac{mR_n + \gamma * 6.43(1 + 0.536 * U_2)\delta e}{\lambda((m + \gamma))}$$

$E_{mass}$=Evaporation rate (mm day-1)
$m$=Slope of the saturation vapor pressure curve (kPa K-1)
Rn=Net irradiance (MJ m$^{-2}$ day$^{-1}$)
$\gamma$=psychrometric constant=
$U_2$=Wind speed (m s$^{-1}$)
$\Delta e$=vapor pressure deficit (kPa)
$\Lambda_V$=latent heat of vaporization (MJ kg$^{-1}$)
Note: this formula implicitly includes the division of the numerator by the density of water (1000 kg m-3) to obtain evaporation in units of mm d-1

The present disclosed embodiments, however, involve a reconsideration and reworking of the Penman equation. In view of the present disclosure, additional variables are considered when attempting to accurately calculate and portray desalination evaporation. Without being bound to any particular theory, the formula below is considered a more accurate representation of desalination evaporation:

$$E_{mass} = \frac{mR_n + R_{n6} * X + \gamma * 6.43(1 + 0.536 * U_2 * \Upsilon * \Xi)\delta e * \Lambda_6 * K_\alpha}{\lambda \Gamma((m + \gamma)/T_6 * H_6)}$$

$E_{mass}$=Evaporation rate (mm day-1)
$m$=Slope of the saturation vapor pressure curve (kPa K-1)
Rn=Net irradiance (MJ m$^{-2}$ day$^{-1}$)

$$\gamma = \text{psychrometric constant} = \frac{0.0016286 * P_{kPa}}{\lambda_v} (kPaK^{-1})$$

$U_2$=Wind speed (m s$^{-1}$)
$\Delta e$=vapor pressure deficit (kPa)
$\Lambda_V$=latent heat of vaporization (MJ kg$^{-1}$)
Note: this formula implicitly includes the division of the numerator by the density of water (1000 kg m-3) to obtain evaporation in units of mm d-1
Additional variables to be included/factored into the Penman equation in view of the invention disclosed herein:
X=Evaporative surface area multiplier (no units/relative to assumed flat sea area X*Y m$^2$), typically 3× to 4×
Y=Agitation quotient multiplier (additional Kinetic forces to break surface tension/skin)
$\Xi$=Quantity of escaping air*vertical escape velocity of air below water*constant// I sec$^{-1}$*m sec$^{-1}$ (the so-called "froth" generated accelerator constant)
$\Gamma$=Gravity Pull (non-horizontal evaporation plane) volume water at angle (constant no units) Angular Evaporation Force Multiplier vs. horizontal/level drying generally tested to be ⅓×+)
$\Lambda_\delta$=In system Pressure drop from ambient pressure
$K_\alpha$=Added Kinetics reaction Force driving humid air into Membrane describes upward (mass/sec)(amount*velocity) of air (not across water surface)
$T_\delta$. In system Temperature drop (degrees C.) from ambient
$H_\delta$. Humidity delta in system vs. outside (due to evaporation and vacuum effect)
$Rn_\delta$=Non solar/sun time production (17 hours)*% production output decreased (tested 33%=⅓)
Hamon's Equation $$E = \frac{2.1 H_t^2 e_5}{(T_t + 273.2)}$$

E=evaporation, day t [mm day$^{-1}$]
$H_t$=average number of daylight hours per day during the month in which day t falls
$e_s$=saturated vapor pressure at temperature T [kPa]
$T_t$=temperature, day t [° C.]
$H_t$ can be calculated by using the maximum number of daylight hours on day t, $N_t$, which is equal to $$\frac{24\omega_s}{\pi},$$

where $w_s$ is the sunset hour angle of day t. On days when $T_t <= 0$, Haith and Shoemaker set E=0. Daily values of E are then summed over the period of interest to obtain the monthly or annual estimate.

Numerous attempts have been made to estimate/calculate the evaporation rate (mm/d$^{-1}$) of water from oceans, seas, and lakes. Pan studies by Rohwer 1931, Young 1947, Kohler 1954/9, all attempt to determine how quickly water levels drop, in still, non-agitated, ambient temp At least one issue with these calculations is that in an open system (the earth) a large amount of water returns back to the system in the form of rainfall. Evaporation may quickly be followed by precipitation. Some areas may have waves and air/ocean mixing, while others unpredictably do not, but in a closed system, these variables are all controlled.

Current desalination systems also don't recognize or utilize these factors.

$$g_s = \Theta A(x_s - x)/3600 \quad (1)$$

or $$g_h = \Theta A(x_s - x)$$

where
$g_s$=amount of evaporated water per second (kg/s)
$g_h$=amount of evaporated water per hour (kg/h)
$\Theta = (25 + 19\,v)$=evaporation coefficient (kg/m$^2$h)
v=velocity of air above the water surface (m/s)
A=water surface area (m$^2$)
$x_s$=humidity ratio saturated air at the same temperature as the water surface (kg/kg) (kg H$_2$O in kg Dry Air)
x=humidity ratio air (kg/kg) (kg H$_2$O in kg Dry Air)

With reference to FIG. 1, exemplary embodiments of the present disclosure provide a method for desalinating a liquid, such as water. In certain embodiments the method includes providing a saline/salt water input or feed, which may be accomplished, for example, by using tidal flow of a body of water, such as an ocean, sea, or lake. In certain embodiments the invention includes mechanisms to modify or increase the input and vessel liquid temperature. These devices may include, for example, electrical or solar heating elements. Additional means of a water input or feed include gravity feed from a tank or other container, pump feed from a tank or other container or source (e.g., a well). In addition, a device of the invention may be configured to contain a self-leveling float valve connected to a mechanism that controls liquid input into the reservoir of the device. Further, exemplary devices include overflow discharge ports that allow release of excess liquid from the reservoir. In certain embodiments, the method and/or device subject the input liquid to an evaporation process. In some embodiments, the process includes kinetic energy input from one or more agitators, wherein the agitators may be connected to one or more drive shafts. In certain embodiments, the one or more drive shafts are driven by energy derived from motor, wind, mechanical, human, animal, solar, battery, and/or fuel cell energy sources. The one or more agitators may be connect to one (single axis) or more than one (dual axis, etc.) drive shafts or rods.

The kinetic energy introduced into the liquid may results in agitation of liquid, including aeration, bubble and/or froth production. As a result, vertical rising air may escape from the liquid, resulting in breaking of the surface tension of the liquid. In addition, an exemplary method and/or device includes providing an air pattern or path above the liquid and/or over the surface of the liquid that may result in transporting liquid droplets onto a capture surface, which may comprise a membrane. The capture surface may be present in any known geometrical shape, including dome and hyperbolic shapes. Liquid droplets or molecules on the capture surface may be condensed and collected in one or more collection or condensate reservoir. The exemplary methods and/or device can include one or more than one known condensate coils to add in the condensation process.

In certain embodiments, the method and/or device can include one or more exhaust fans that create a negative ambient vessel pressure (lower the temperature) to aid in the evaporation process. Such one or more exhaust fans more also be used to drive humid air into one or more collection or condensate vessels or reservoirs. In certain embodiments, the method and/or device can include condensing the liquid in a chamber with a reduced temperature compared to the temperature of the liquid reservoir. The reduced temperature chamber or reservoir may be present below ground. In some embodiments, the method includes draining the collected condensed liquid to allow for transport. Such process of draining may include gravity assisted draining, pump assisted draining, and combinations thereof.

Figure 2A:
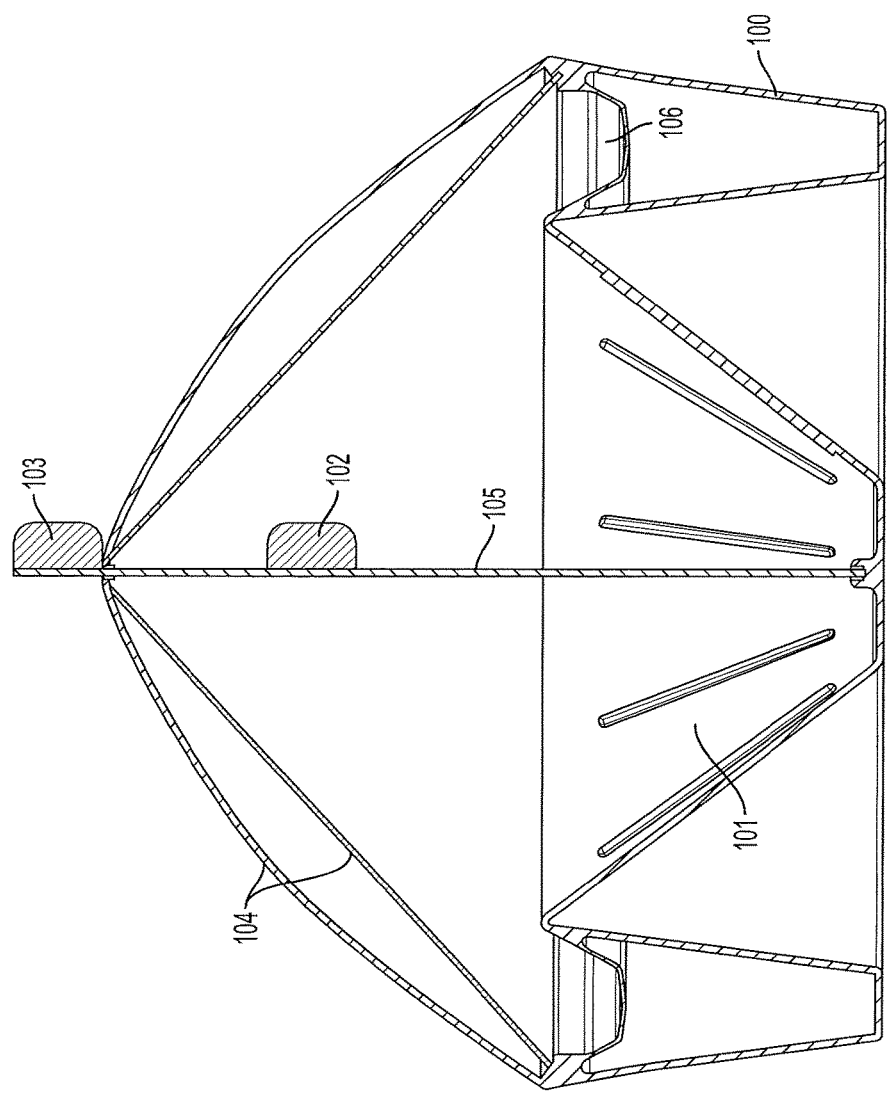
FIGS. 2A (cross-sectional view) and 2B depict exemplary circular-shaped devices that can be used for enhanced evaporation, which may be driven, at least in part, by wind power.
Figure 2B:
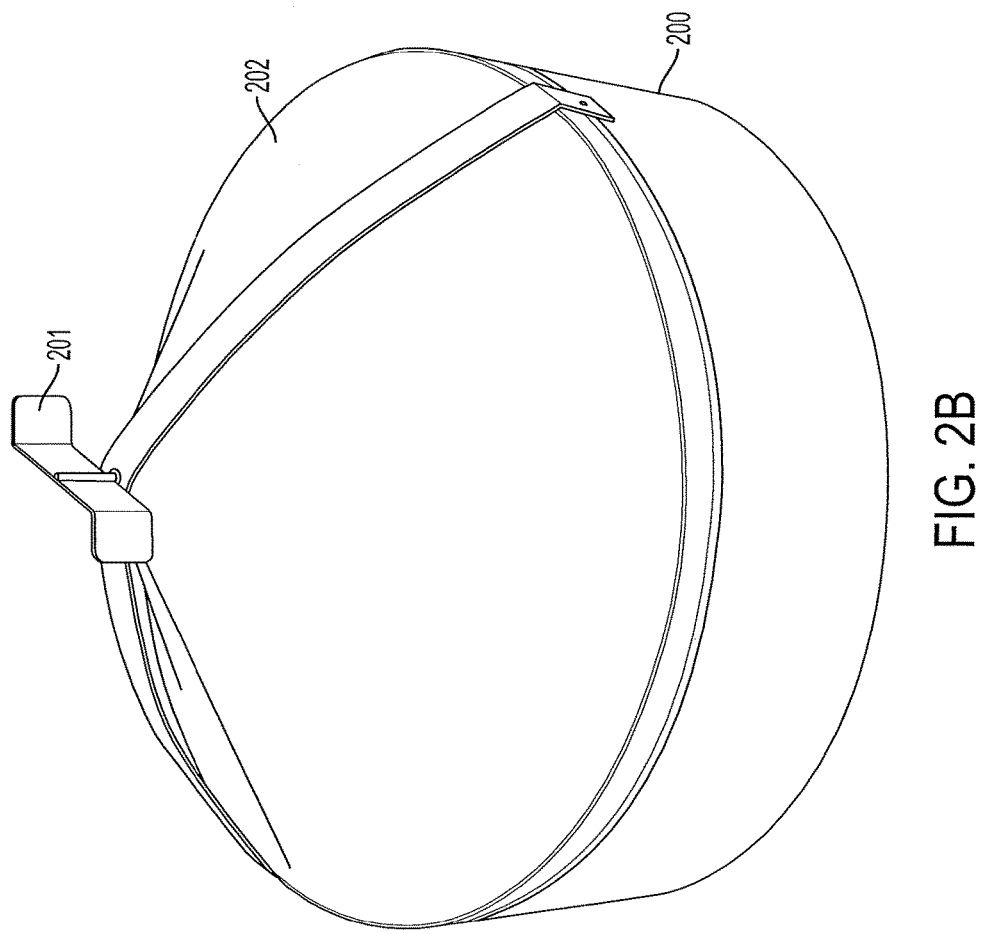

With reference to FIGS. 2A and 2B, exemplary embodiments of the present disclosure provide for a device having a housing 100 and 200, a reservoir 101 for the liquid, one or more agitators 102 connected to a drive shaft or rod 105, a wind vane 103 and 201 connected to a drive shaft or rod 105 for providing kinetic energy to one or more agitators 102. The device can include a capture surface 104 and 202 that may be dome shaped or more planar, and a collection or condensate reservoir or chamber 106.

Figure 3:
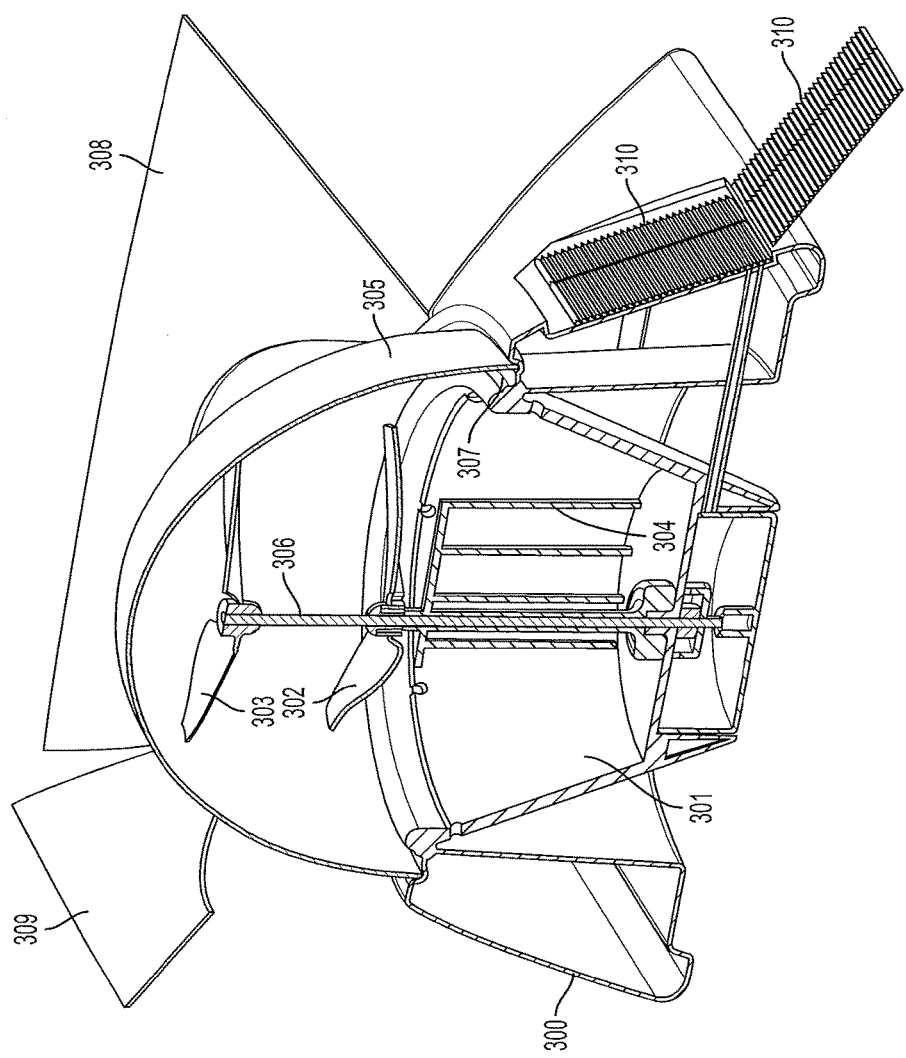
FIGS. 3 and 4 depict exemplary circular-shaped devices that can be used for enhanced evaporation, which may be driven, at least in part, by solar power.

With reference to FIG. 3, exemplary embodiments of the present disclosure provide for a device having a housing 300, a reservoir for the liquid 301, one or more agitators 302, 303, and 304. The one or more agitators may be completely or partially submerged in the liquid 304 or may be suspended above the surface of the liquid 302 and 303. The agitator may be a propeller or blade 302 and 303 and/or may include a paddle 304. The device can include a capture surface (e.g., dome shaped) 305 and a drive rod or shaft 306 that is connected to and provides kinetic energy to the agitators 302, 303, and 304. The device can include a collection or condensate reservoir 307, one or more reflectors 308 and 309 and one or more solar panels 310 to provide energy for driving the drive rod or shaft 306.

Figure 4:
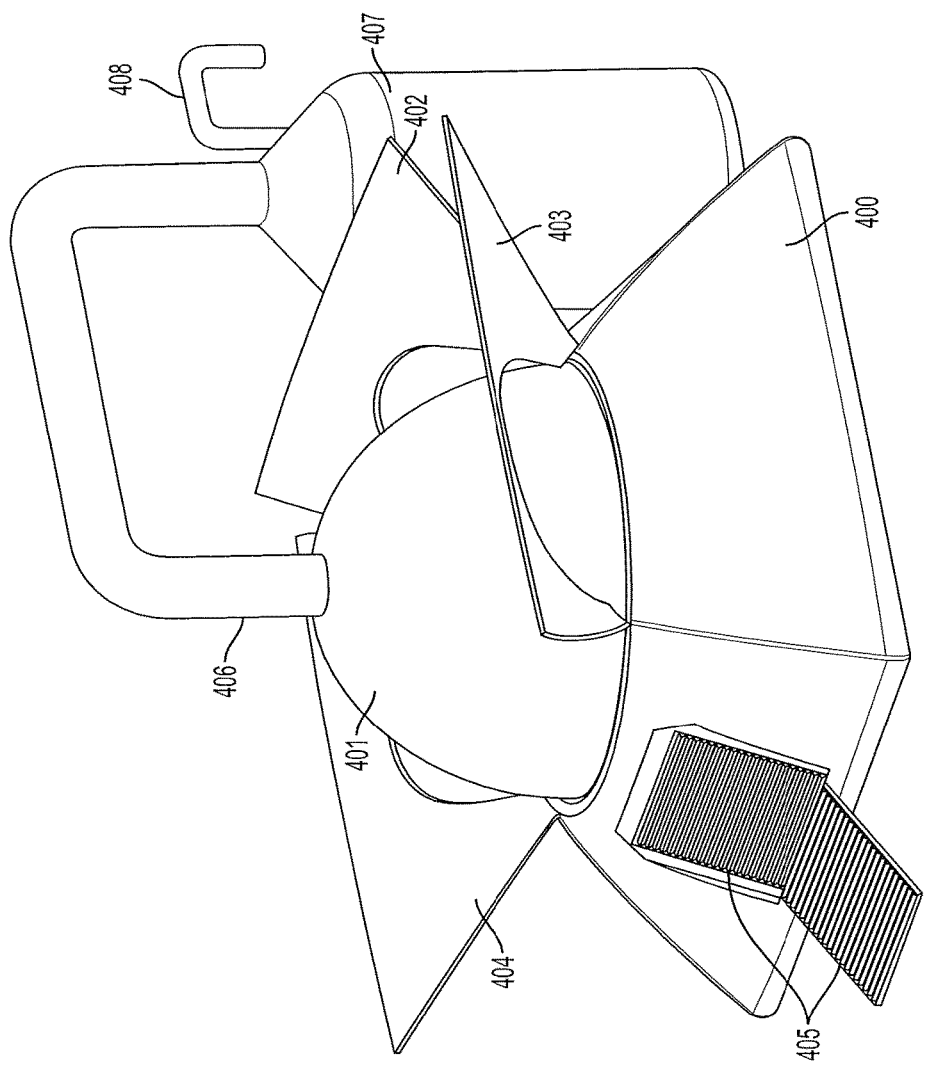

With reference to FIG. 4, exemplary embodiments of the present disclosure provide for a device having a housing 400, a capture surface, which can be dome shaped 401, and one or more reflectors 402, 403, and 404. In addition, the device can include one or more solar panels 405, one or more collection tubes 406, an external collection or condensate reservoir or chamber 407, and a collection chamber or condensate reservoir drain 408.

Figure 5:
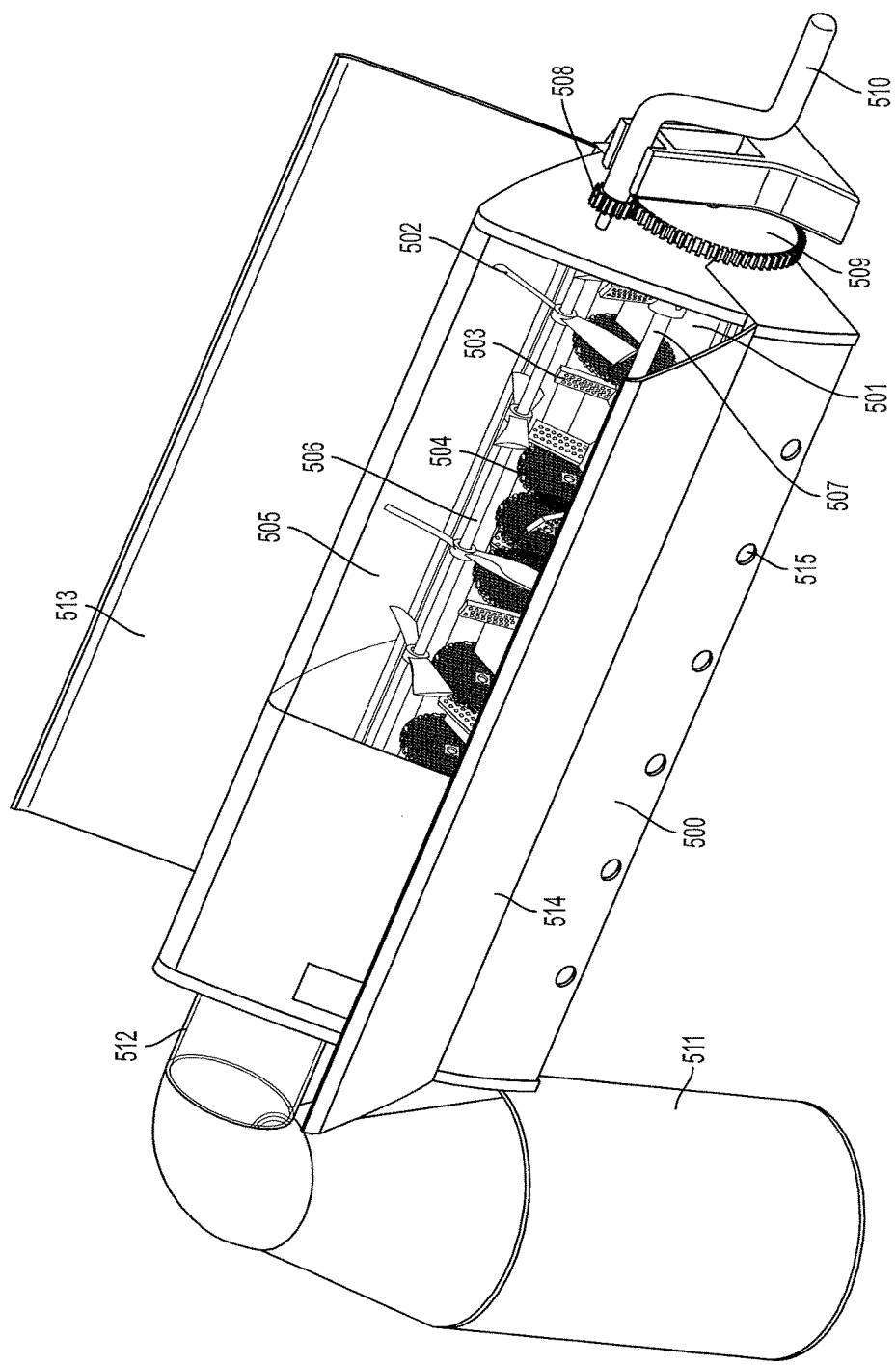
FIGS. 5 and 6 depict exemplary linear-shaped devices that can be used for enhanced evaporation, which may be driven, at least in part, by hand or mechanical power.
Figure 6:
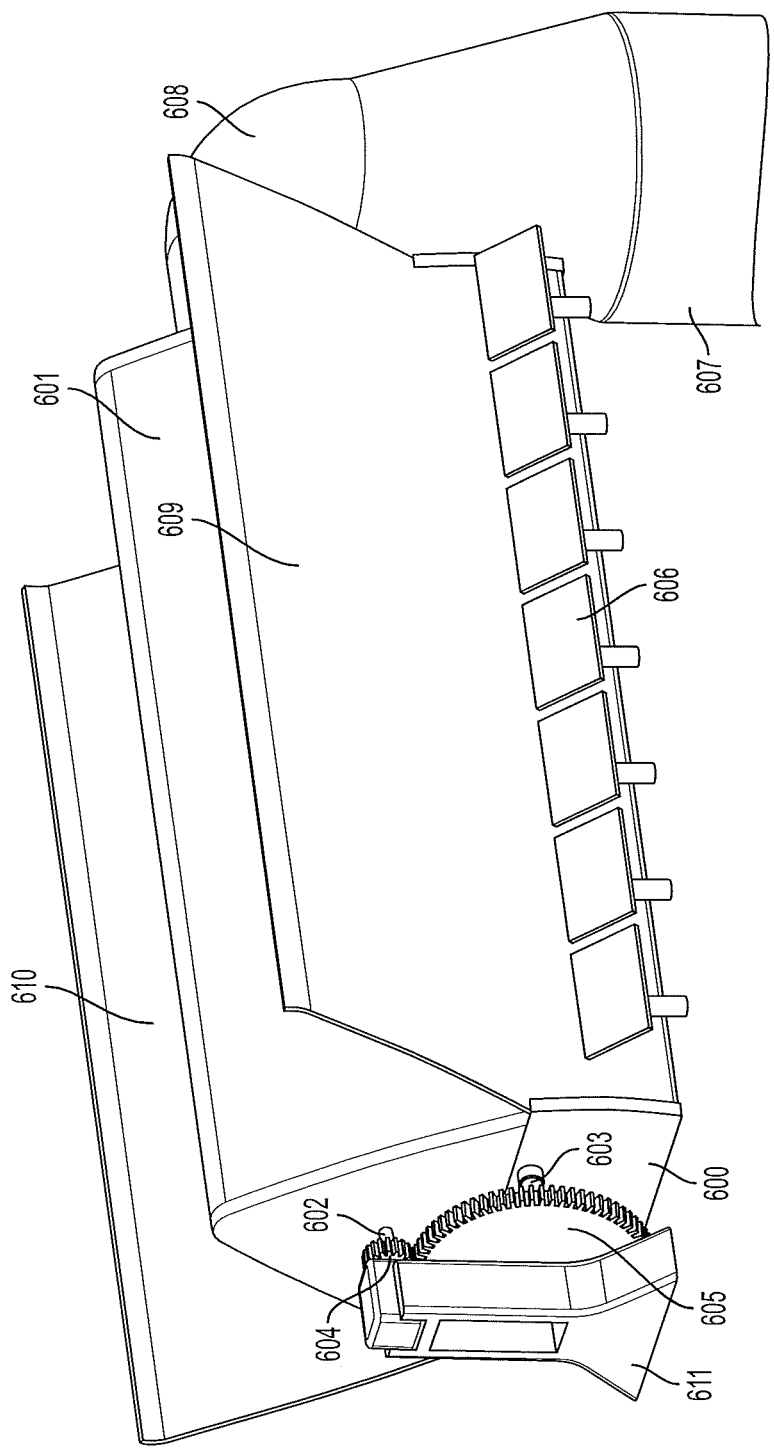

With reference to FIGS. 5 and 6, exemplary embodiments of the present disclosure provide for a device having a housing 500 and 600 with overflow holes 515 to prevent overfilling, a reservoir for holding the liquid 501, and one or more agitators 502, 503, and 504. The one or more agitators can include a propeller or blade 502, a paddle 503, or a disc 504. The device can also include a capture surface 505 and 601 that may be hyperbolic in shape and may range from translucent to opaque. The device can include one or more drive shafts or rods 506, 507, 602, and 603 that are connected to one or more agitators 502, 503, and 504. The drive shafts or rods may be oriented in a vertical orientation resulting in an upper drive shaft or rod 506 and 602, and a lower drive shaft or rod 507 and 603. The one or more drive shafts or rods may be connected to one or more gears 508, 509, 604, and 605, which may be provided in a vertical orientation resulting in an upper gear 508 and 604, and lower gear 509 and 605. The gears 508, 509, 604, and 605 may be different sizes relative to one another to allow for varying rates of revolution of the one or more drive shafts or rods 506, 507, 602, and 603 relative to each other. The device can include a hand crank 510 connected to one or more of the gears 508 and 509 and one or more of the drive shafts or rods 506 and 507. Alternatively, or in addition, the device can include a motor drive 611 connected to one or more of the gears 604 and 605 and one or more of the drive shafts or rods 602 and 603. The device can include a collection or condensate reservoir or chamber 511 and 607 connected to a collection tube 512 and 608. In addition, the device can include one or more reflectors or reflection panels 513, 514, 609, and 610. The device can include one or more solar panels 606 to provide energy for driving the one or more drive rods or shafts 602 and 603.

Figure 7:
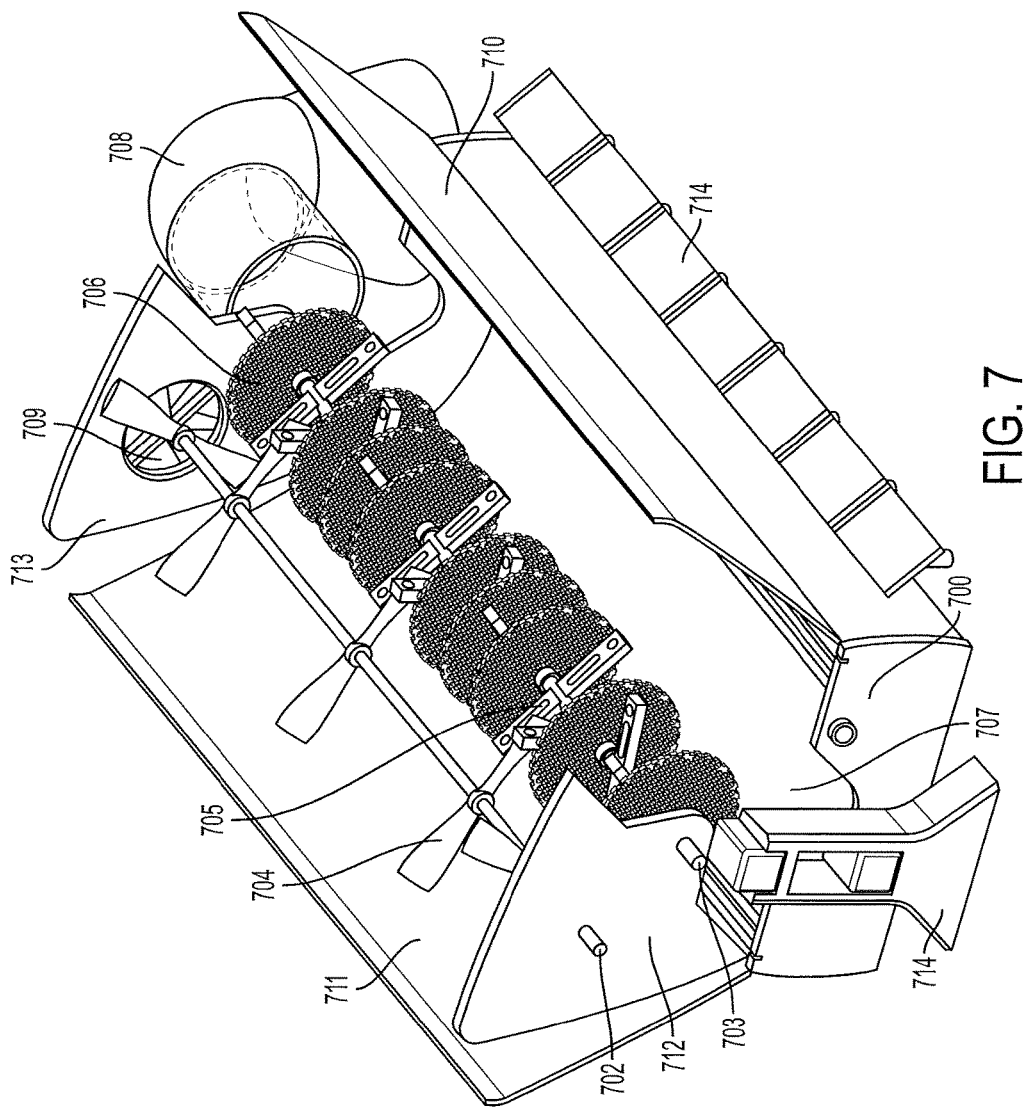
FIG. 7 depicts an exemplary linear-shaped device that can be used for enhanced evaporation, and which can be easily accessed for cleaning and repair due to the hinged portions of the housing that enable a portion of the housing and its associated components to be pivoted free of the base and reservoir of the device.
Figure 8:
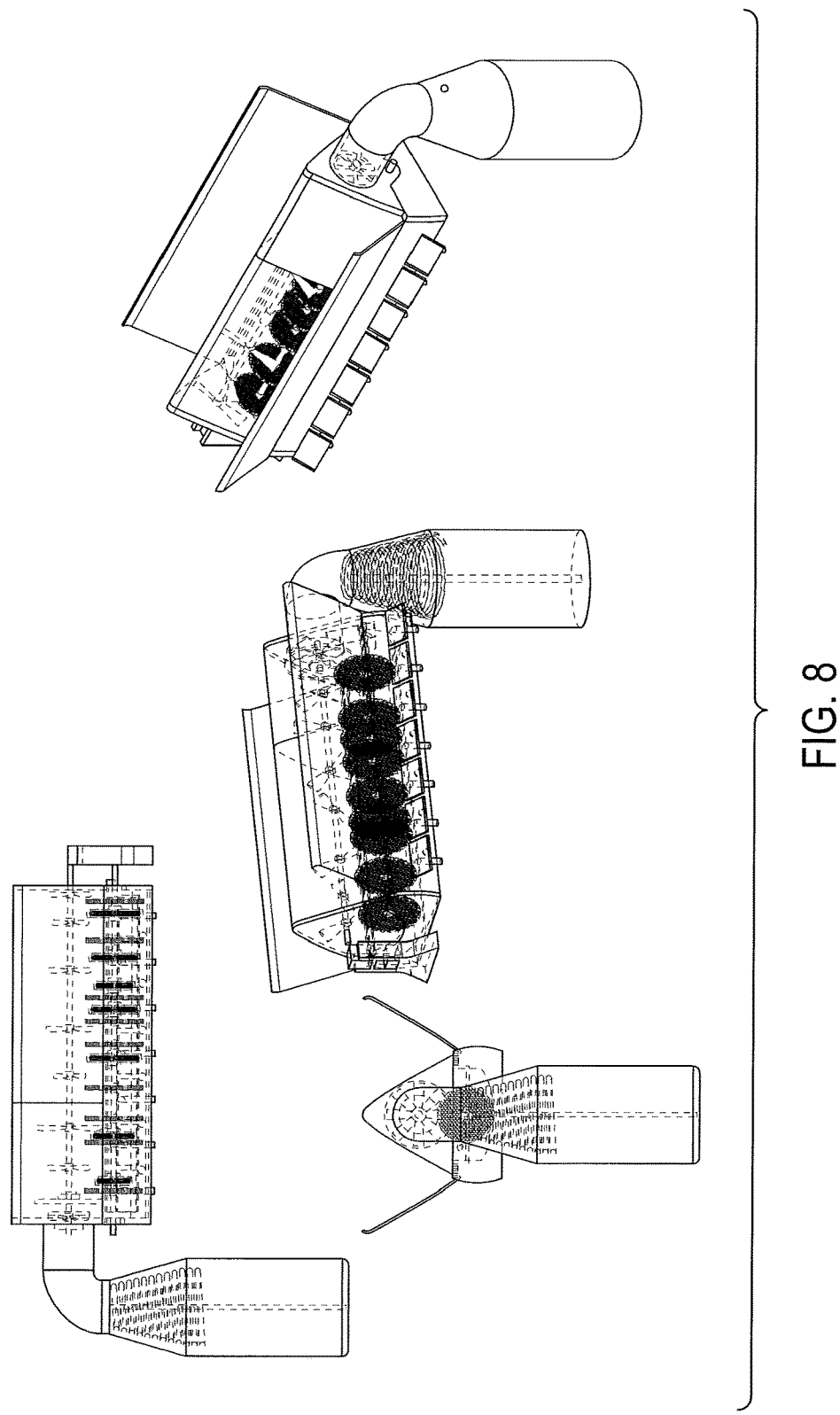
FIG. 8 contains several exemplary schematics detailing a linear-shaped device exemplary embodiment.

With reference to FIG. 7, exemplary embodiments of the present disclosure provide for a device having a housing 700, a reservoir for holding the liquid 707, and one or more agitators 704, 705, and 706. The one or more agitators can include a propeller or blade 704, a paddle 705, or a disc 706. The device can include one or more drive shafts or rods 702 and 703 that are connected to one or more agitators 704, 705, and 706. The drive shafts or rods may be oriented in a vertical orientation resulting in an upper drive shaft or rod 702, and a lower drive shaft or rod 703. The device can include a motor drive 714 able to move one or more of the drive shafts or rods 702 and 703. The device can include one or more reflectors or reflection panels 710 and 711. In addition, the device can include one or more solar panels 714 to provide energy for driving the motor drive 714. The device can include a collection or condensate tube 708. The device can include one or more exhaust fans 709 placed inside an exhaust fan housing 713, wherein the exhaust fan 709 is capable of moving air into the collection or condensate tube 708. In addition, the drive shafts or rods 702 and 703 may be connected to a drive shaft or rod housing 712 and exhaust fan housing 713, wherein the drive shaft or rod housing 712 and exhaust fan housing 713 are able to be separated from the main housing 700 to allow access to the reservoir 707 and other components of the device.

Figure 9:
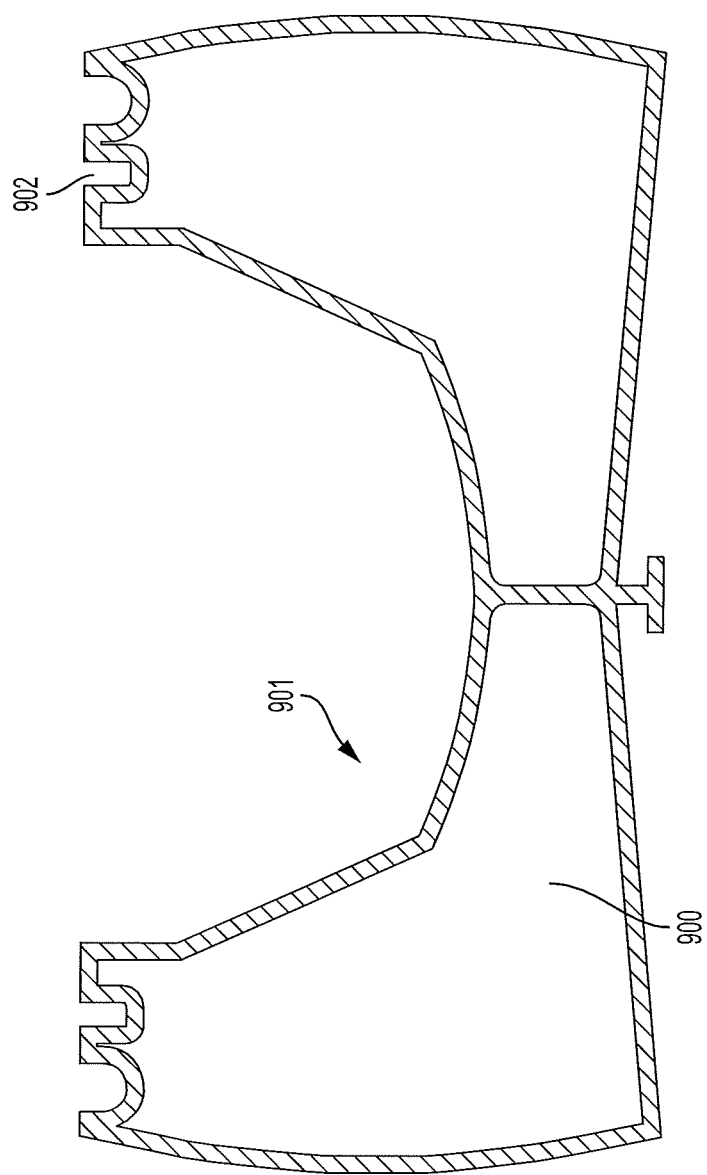
FIG. 9 is a cross-section view of an exemplary base component of a linear-shaped device.

FIG. 9 is a cross sectional view of the housing 900 of an exemplary embodiment of the present disclosure. An exemplary embodiment includes a reservoir for holding the liquid 901.

Figure 10:
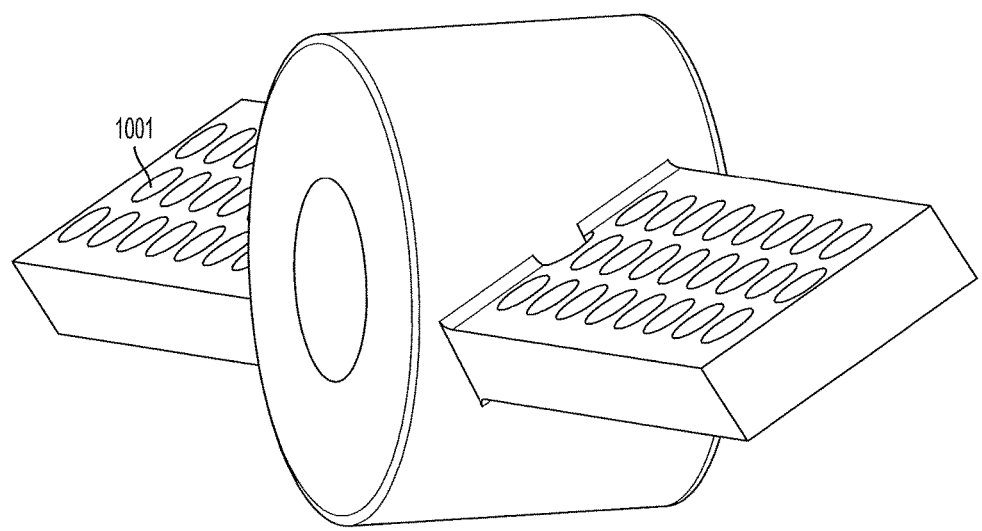
FIG. 10 depicts an exemplary representative paddle agitator that can be used in the method and devices disclosed herein.

FIG. 10 shows an agitator that may be used in the various exemplar embodiments disclosed herein. FIG. 10 represents an exemplary paddle or lap agitator having a honeycomb structure 1001.

Figure 11:
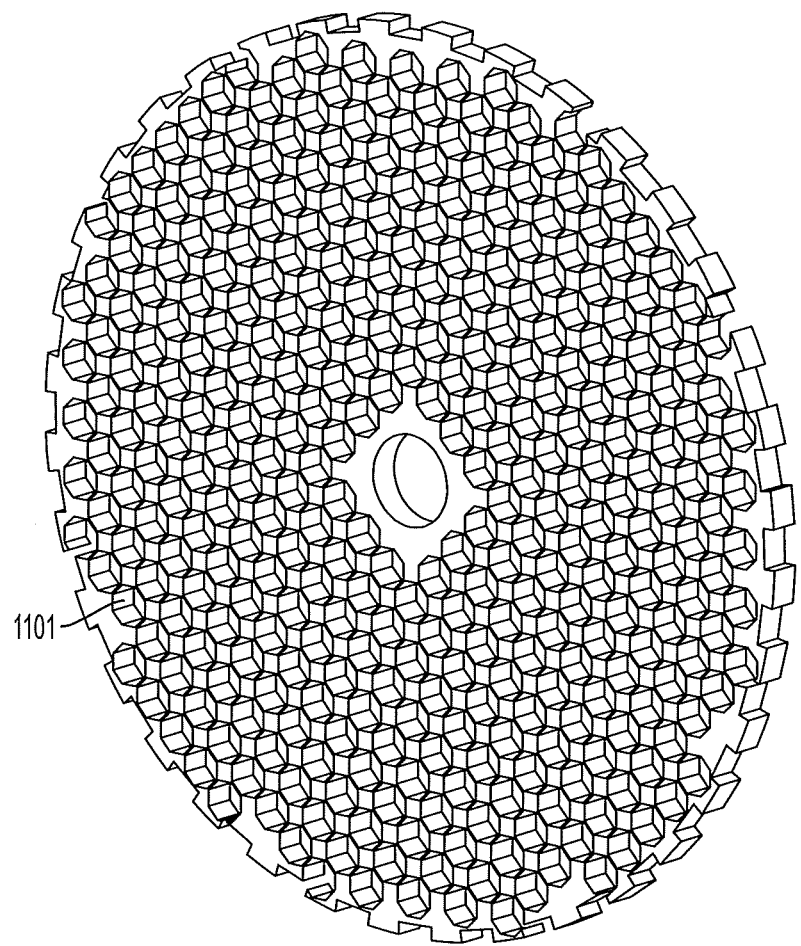
FIG. 11 depicts an exemplary representative disc agitator that can be used in the method and devices disclosed herein.

FIG. 11 shows an agitator that may be used in the various disclosed embodiments. FIG. 11 represents an exemplary circular disc agitator comprising a honeycomb structure 1101.

Figure 12:
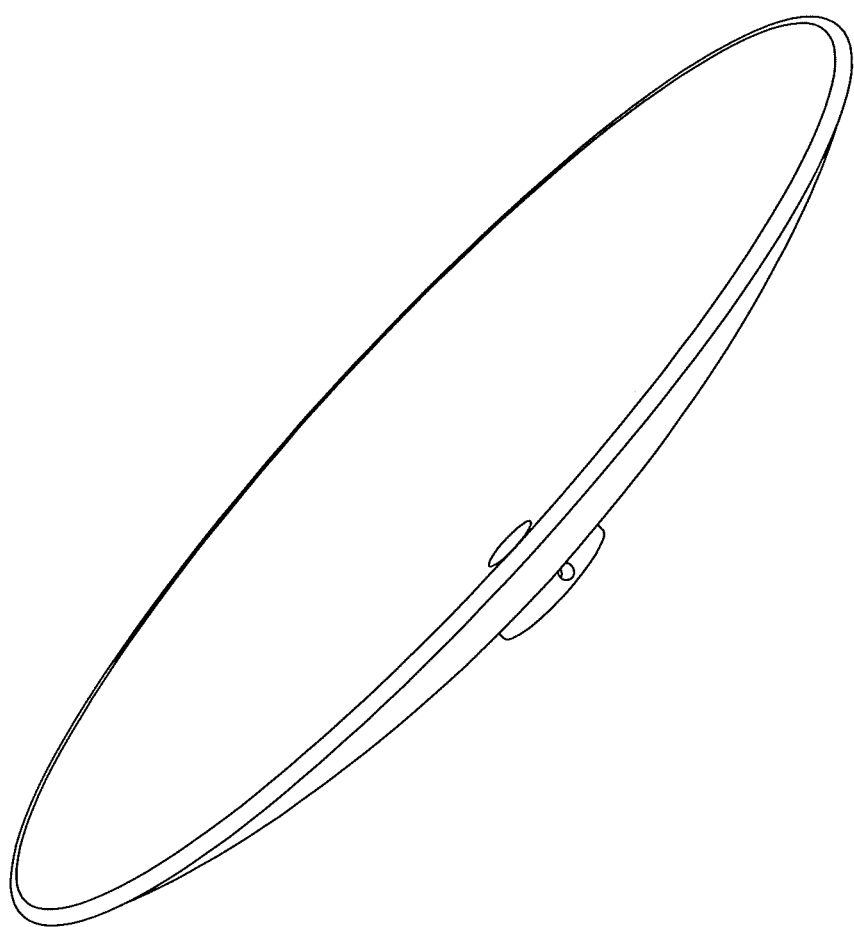
FIG. 12 depicts an exemplary parabolic centrifugal collector/deflector (PCCD) that can be used with the disclosed systems.
Figure 13:
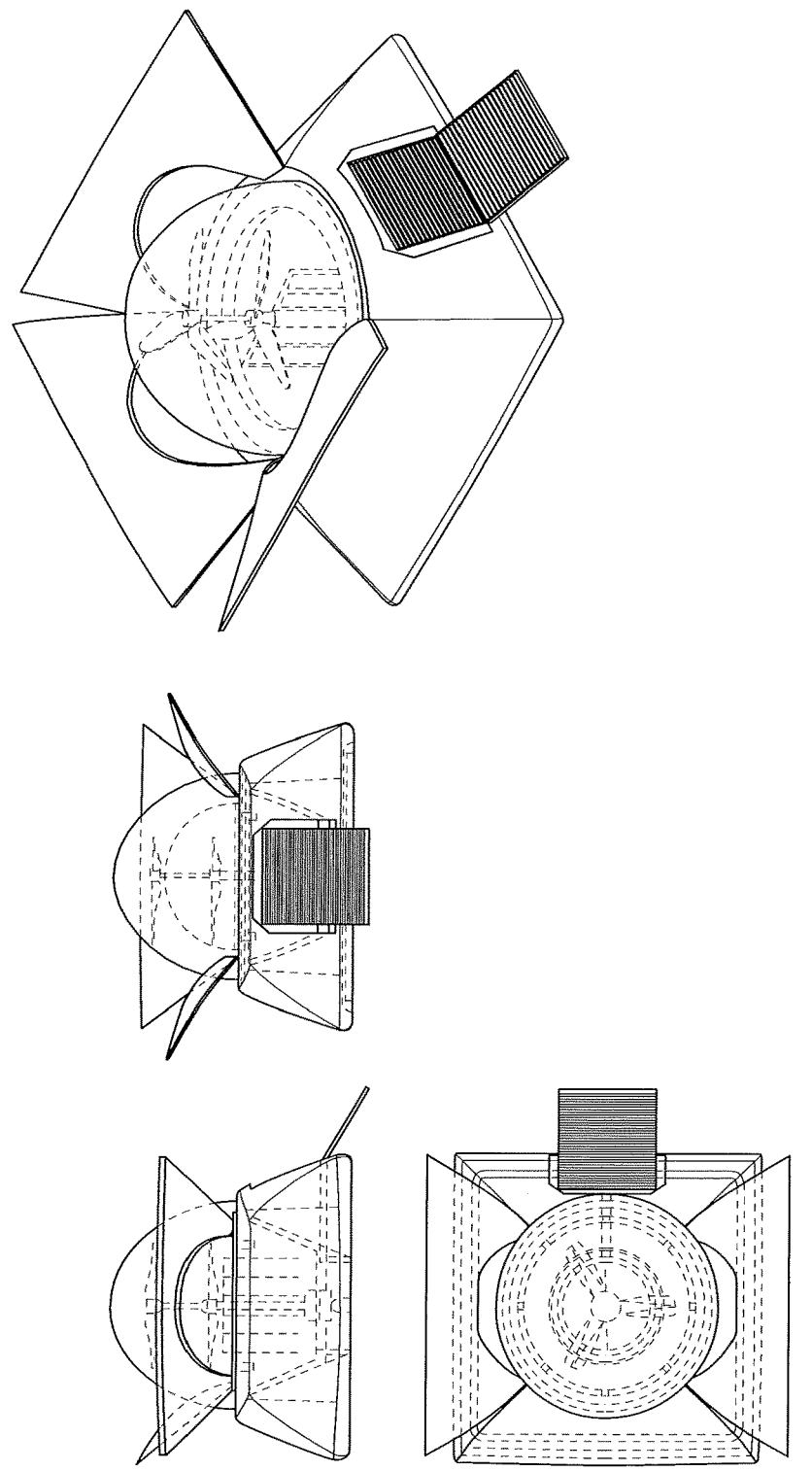
FIG. 13 contains several exemplar schematics detailing an exemplary circular device embodiment.

FIG. 12 represents an exemplary parabolic centrifugal collector/deflector (PCCD) that can be used in various embodiments disclosed herein.

Figure 14:
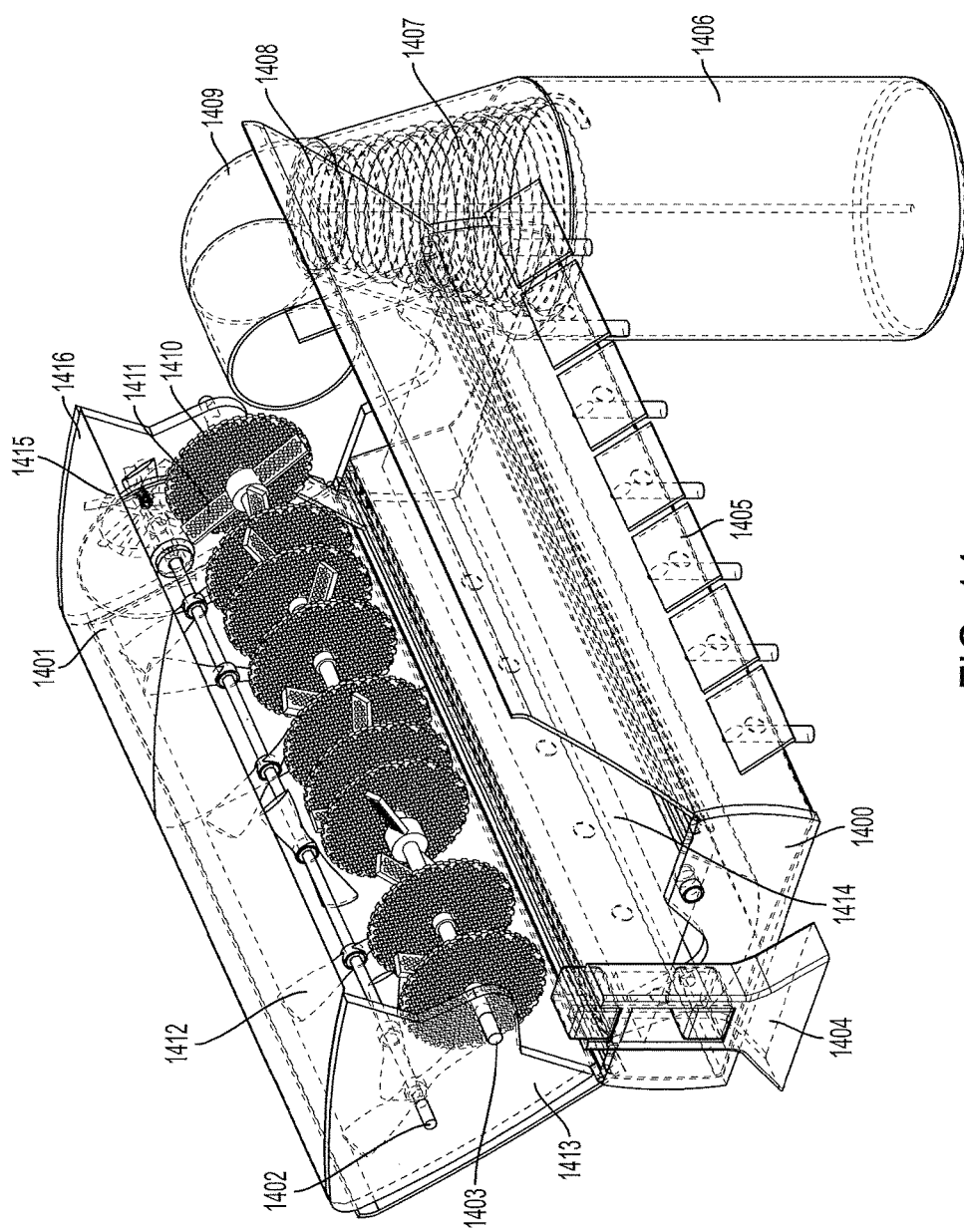
FIG. 14 depicts an exemplary linear-shaped device that can be used for enhanced evaporation, which can be easily accessed for cleaning and repair due to the hinged portions of the housing that enable a portion of the housing and its associated components to be pivoted free of the base and reservoir of the device.

With reference to FIG. 14, exemplary embodiments of the present disclosure provide for a device comprising a housing 1400, a reservoir for holding the liquid 1414, and one or more agitators 1410, 1411, and 1412. The one or more agitators can include a propeller or blade 1412, a paddle 1411, or a disc 1410. The device can include one or more drive shafts or rods 1402 and 1403 that are connected to one or more agitators 1410, 1411, and 1412. The drive shafts or rods may be oriented in a vertical orientation resulting in an upper drive shaft or rod 1402, and a lower drive shaft or rod 1403. The device can include a motor drive 1404 able to move one or more of the drive shafts or rods 1402 and 1403. The device can include one or more reflectors or reflection panels 1408. In addition, the device can include one or more solar panels 1405 to provide energy for driving the motor drive 1404. The device can include a capture surface 1401 that may be hyperbolic in shape and may range from translucent to opaque. The device can include a collection or condensate tube 1409. The device can include one or more exhaust fans 1415 placed within an exhaust fan housing 1416, wherein the exhaust fan 1415 is capable of moving air into the collection or condensate tube 1409. In addition, the drive shafts or rods 1402 and 1403 may be connected to a drive shaft or rod housing 1413 and exhaust fan housing 1416, wherein the drive shaft or rod housing 1413 and exhaust fan housing 1416 are able to be separated from the main housing 1400 via a hinge or other mechanism to allow access to the reservoir 1414 and other components of the device. The device can include a collection or condensate reservoir or chamber 1406 connected to a collection tube 1409. The collection or condensate reservoir or chamber 1406 may contain cooling or condensate coils 1407.

Figure 15:
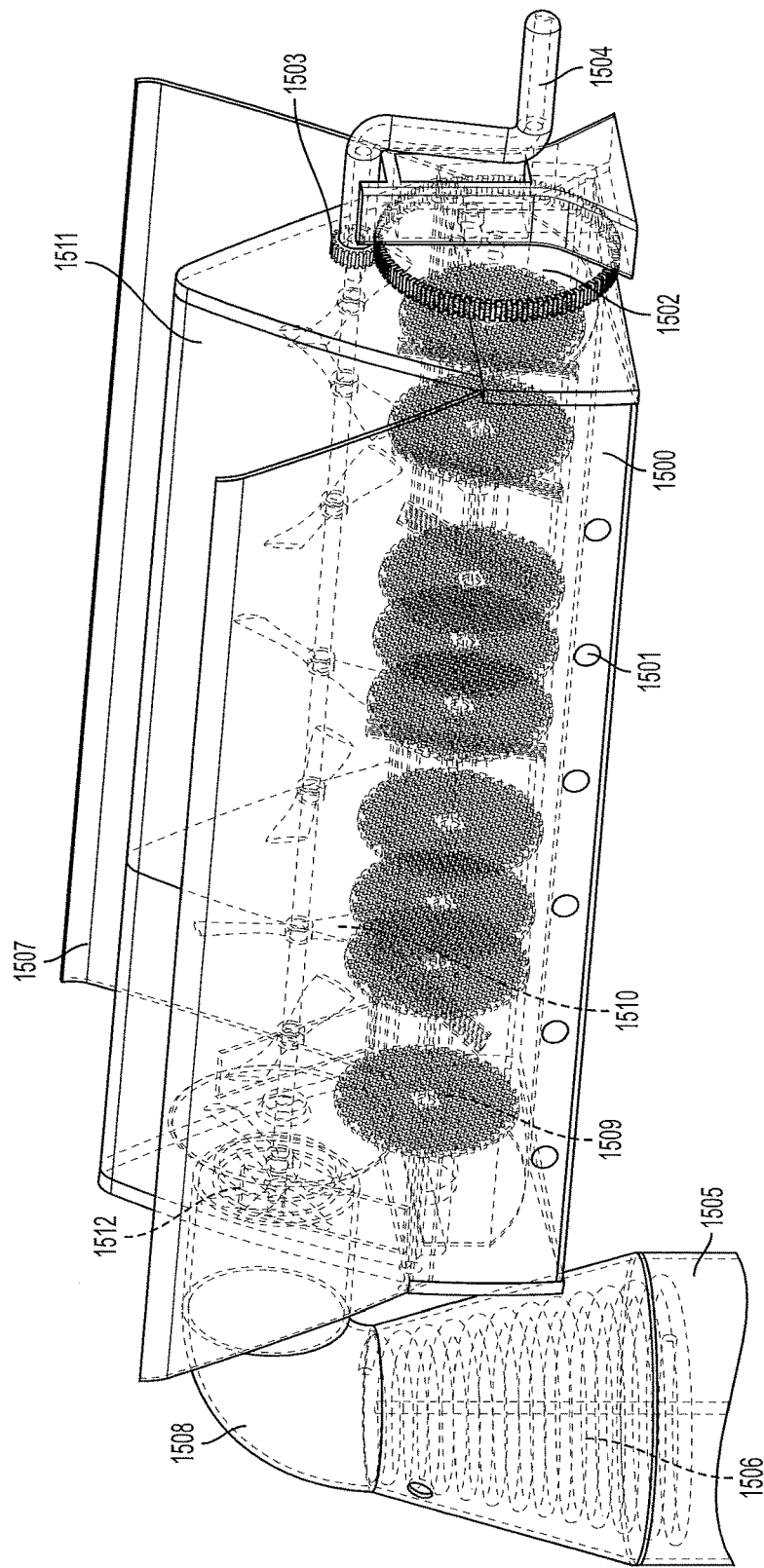
FIG. 15 depicts an exemplary linear-shaped device that can be used for enhanced evaporation, which may be driven, at least in part, by hand or mechanical power.

With reference to FIG. 15, exemplary embodiments of the present disclosure provide for a device having a housing 1500 with overflow holes 1501 to prevent overfilling. The device can include one or more agitators 1509 and 1510. The one or more agitators can include a propeller or blade 1510 or a disc 1509. The device may also comprise one or more drive shafts or rods that are connected to one or more agitators 1509 and 1510. The one or more drive shafts or rods can be connected to one or more gears 1502 and 1503, which may be provided in a vertical orientation resulting in an upper gear 1503 and lower gear 1502. The gears 1502 and 1503 may be different sizes relative to one another to allow for varying rates of revolution of the one or more drive shafts or rods relative to each other. The device can include a hand crank 1504 connected to one or more of the gears 1502 and 1503 and one or more of the drive shafts or rods. The device can include one or more reflectors or reflection panels 1507. The device can include a capture surface 1511 that may be hyperbolic in shape and may range from translucent to opaque. The device can include a collection or condensate tube 1508. The device can include one or more exhaust fans 1512, wherein the exhaust fan 1415 is capable of moving air into the collection or condensate tube 1508. The device can include a collection or condensate reservoir or chamber 1505 connected to a collection tube 1508. The collection or condensate reservoir or chamber 1505 may contain cooling or condensate coils 1506.

Figure 16:
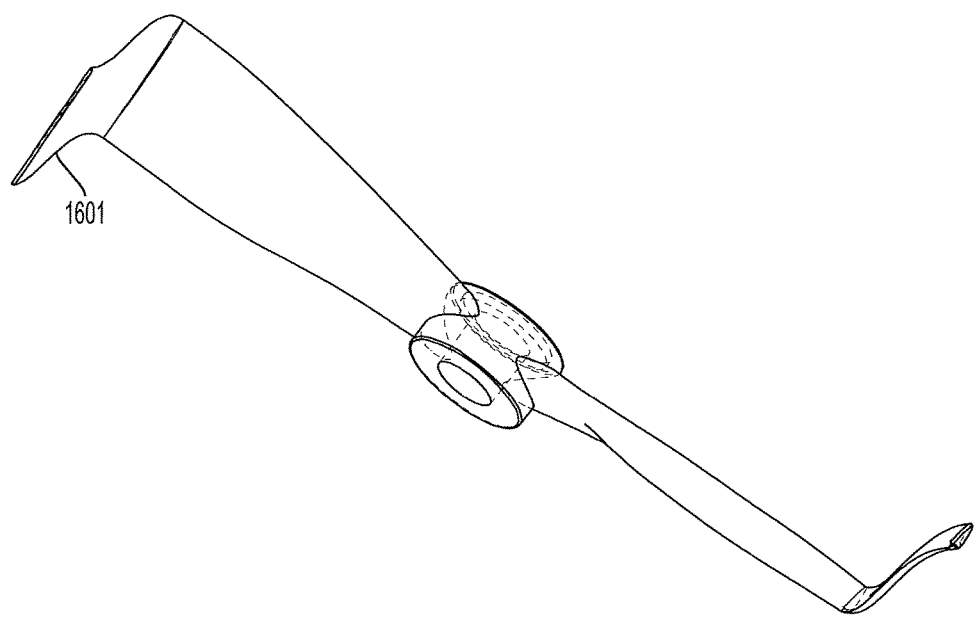
FIG. 16 represents an exemplary propeller or blade having a cupped or curved geometry or surface.

FIG. 16 shows a propeller or blade that may be used in the various embodiments disclosed herein. FIG. 16 represents an exemplary propeller or blade having a cupped or curved geometry or surface 1601.

Figure 17:
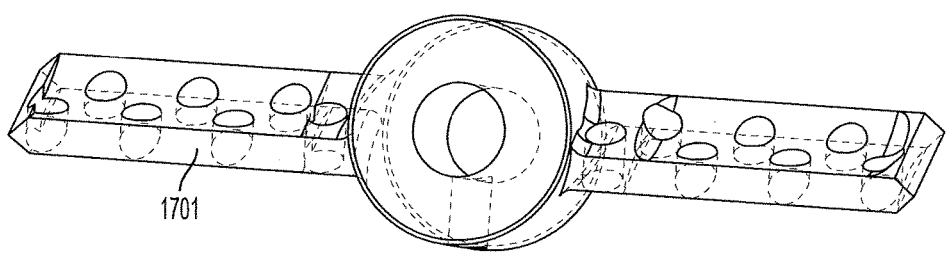
FIG. 17 represents an exemplary propeller or blade having multi-directional extensions with a honeycomb structure.

FIG. 17 shows a propeller or blade that may be used in the various embodiments disclosed herein. FIG. 17 represents an exemplary propeller or blade having multi-directional extensions with a honeycomb structure 1701.

Figure 18:
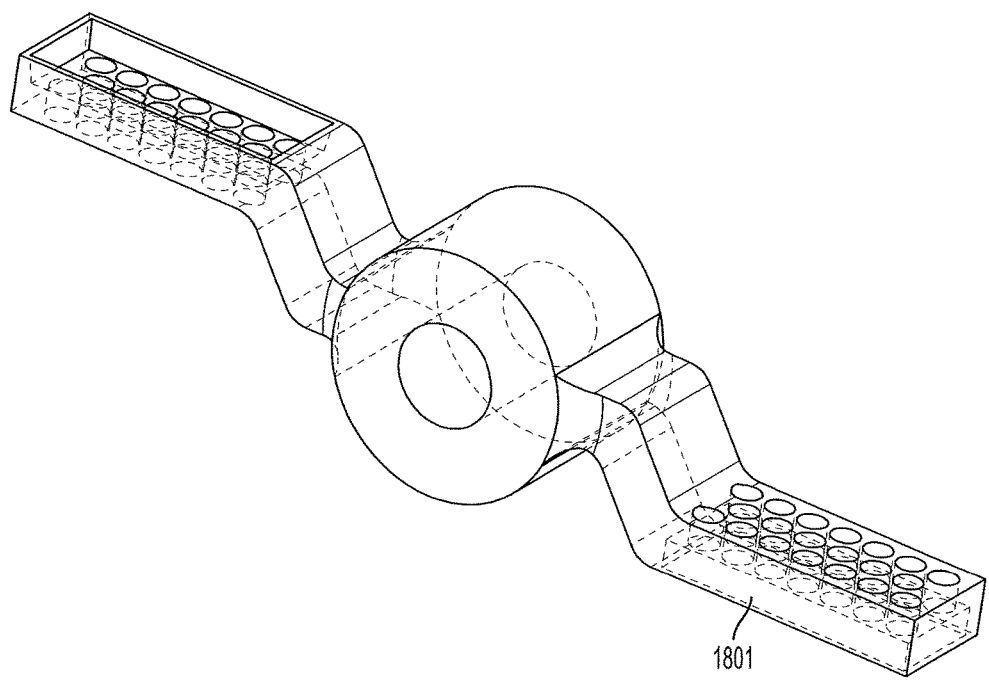
FIG. 18 represents an exemplary paddle or lap agitator having a honeycomb structure and an extension with a bent or curved geometry.

FIG. 18 shows an agitator that may be used in the various embodiments disclosed herein. FIG. 18 represents an exemplary paddle or lap agitator having a honeycomb structure and an extension with a bent or curved geometry 1801.

Figure 19:
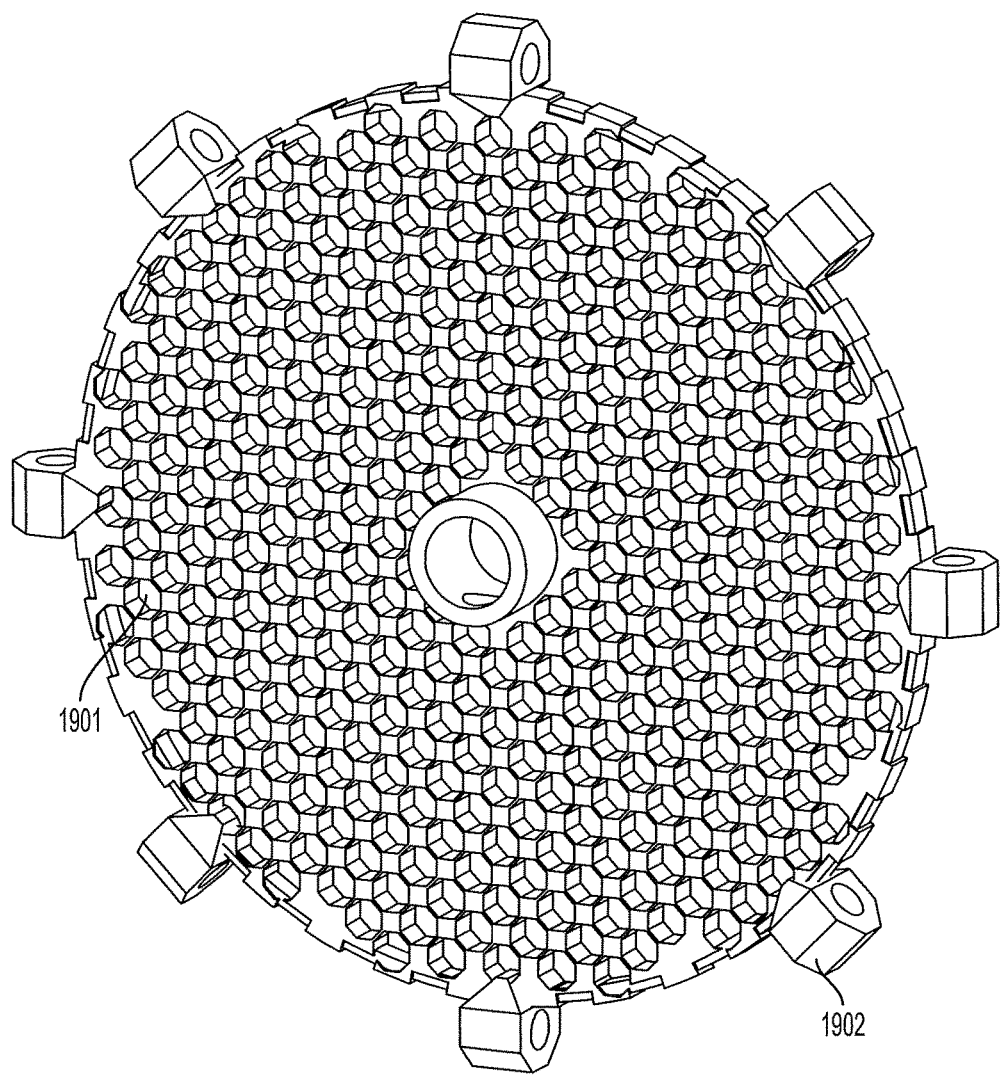
FIG. 19 represents an exemplary circular disc agitator comprising a honeycomb structure and contact protrusions.

FIG. 19 shows an agitator that may be used in the various disclosed embodiments. FIG. 19 represents an exemplary circular disc agitator comprising a honeycomb structure 1901 and contact protrusions 1902.

Figure 20:
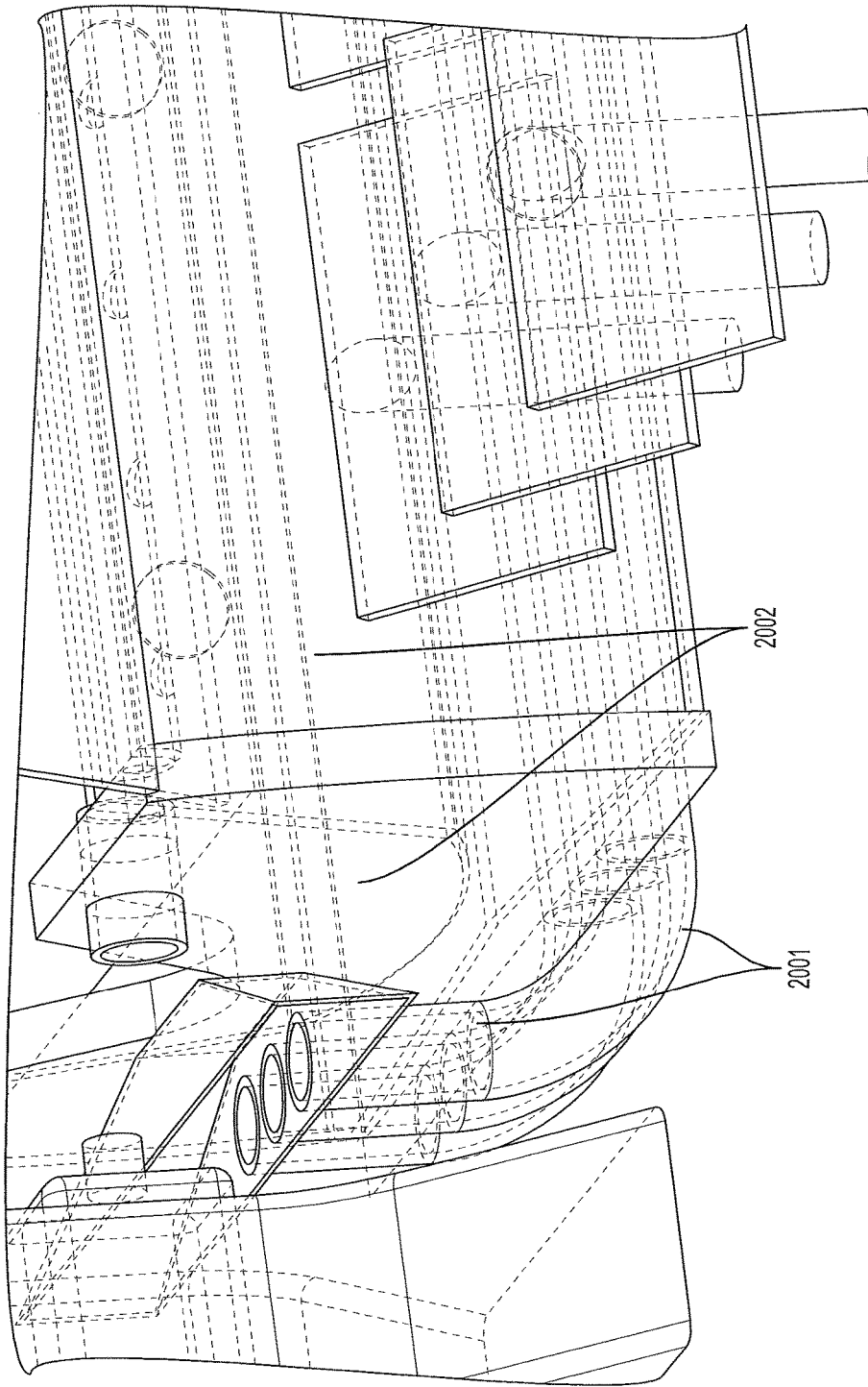
FIG. 20 represents a device having channels that extend under and along a partial length or the full length of the device.

With reference to FIG. 20, exemplary embodiments of the present disclosure provide for a device having channels 2001 (which may be filled with air or any desired liquid) that extend under and along a partial length or the full length of the device 2002 that allow for heating or cooling of the central evaporation unit without affecting evaporation capture tanks located separately from the evaporation unit.

While various exemplary embodiments of the disclosed system, i.e., device, and method have been described above, it should be understood that they have been presented for purposes of example only, not limitations. It is not exhaustive and does not limit the disclosure to the precise form disclosed. Modifications and variations are possible in light of the above teachings and disclosure or may be acquired from practicing of the disclosure, without departing from the breadth or scope. In addition, all components used in the disclosed method and device may be manufactured according to standard methods and techniques, using standard materials known in the art.

The disclosed method and/or system/device can be implemented in any number of ways as discussed above, or as will become apparent to those of ordinary skill in the art after reading this disclosure. These embodiments, as well as variations and modifications thereof, which will occur to those of ordinary skill in the art, are encompassed by the application providing method and system/device. Hence, the scope of the method and/or system/device is limited only by the metes and bounds as articulated in the claims appended hereto.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for increasing a rate of liquid evaporation, the method comprising:
   allowing a flow of liquid into an at least partially closed volume of a reservoir; and
   introducing kinetic energy through one or more mechanical agitators located within the partially closed volume, to disrupt a surface or interfacial tension of the liquid within the at least partially closed volume, the one or more mechanical agitators being arranged to contact the liquid and cause displacement of droplets of the liquid in an at least partially vertical direction which is substantially perpendicular to the liquid surface and counter to a gravitational force to produce humid air above the surface of the liquid.

2. The method of claim 1, comprising:
   applying an air flow path approximately parallel to the liquid surface to act on the liquid droplets displaced from the liquid surface.

3. The method of claim 2, comprising:
   carrying a vapor with droplets of the liquid away from the surface of the liquid.

4. The method of claim 1, comprising:
   contacting the air above the liquid with one or more mechanical agitators, wherein the one or more mechanical agitators contacting the liquid and/or the one or more mechanical agitators contacting the air include a paddle, a disc, a propeller-like blade, or a combination thereof.

5. The method of claim 1, comprising:
   applying an additional air flow path above the liquid, which is approximately parallel to the liquid surface to remove the humid from air above the liquid.

6. The method of claim 1, comprising:
   reducing air pressure above the surface of the liquid and/or increasing evaporative surface area of the liquid.

7. The method of claim 6, wherein the evaporative surface area of the liquid is increased by contacting the liquid with one or mechanical agitators that includes a honeycombed structure.

8. The method of claim 1, comprising:
   cooling the humid air and/or passing the humid air through a membrane and/or condensation tubing, and condensing at least a portion of the humid air to form a condensed liquid.

9. The method of claim 8, comprising:
   collecting at least a portion of the condensed liquid.

10. The method of claim 1, comprising:
    capturing at least a portion of the humid air on a capture surface, condensing at least a portion of humid air on the capture surface to form a condensed liquid, and collecting at least a portion of the condensed liquid.

11. The method of claim 1, comprising:
    connecting the one or more mechanical agitators to a power supply that is fueled by solar energy, wind energy, mechanical energy, human or animal motion, a battery, or a combination thereof.

12. A device for evaporation of a liquid, the device comprising:
    a reservoir for retaining a volume of liquid within an at least partially closed volume located above a designated liquid surface of the reservoir;
    a mechanical agitator configured and arranged for contacting the liquid when present in the reservoir and displacing droplets of the liquid in an at least partially vertical direction perpendicular to a surface of the liquid and counter to a direction of gravitational force; and
    one or more air flow devices for producing an air flow approximately parallel to the liquid surface so as to act on droplets displaced from the liquid in the at least partially vertical direction.

13. The device of claim 12, comprising:
    sloped walls positioned over the reservoir at angles to a surface of liquid when present in the reservoir to form the at least partially closed volume.

14. The device of claim 12, wherein the mechanical agitator comprises:
    one or more lap paddles with honeycomb structure and/or one or more discs with honeycomb structure arranged on a first axis.

15. The device of claim 14, wherein the air flow device comprises:
    one or more propeller-like blades arranged on a second axis parallel to the first axis.

16. The device of claim 12, comprising:
    an outlet tube for receiving liquid droplets removed from the at least partially closed volume via air flow produced by the one or more air flow devices.

17. The device of claim 12, comprising:
    an elbow for connecting an outlet tube with a condensation reservoir.

18. The device of claim 12, in combination with a condensation reservoir located beneath a surface of the earth.

19. The device of claim 12, in combination with a power supply, wherein the power supply is fueled by solar energy, wind energy, mechanical energy, human or animal motion, a battery, or a combination thereof.

* * * * *